United States Patent
Ramachandran et al.

(10) Patent No.: US 12,530,565 B2
(45) Date of Patent: Jan. 20, 2026

(54) SYSTEMS AND METHODS FOR SAFE POLICY IMPROVEMENT FOR TASK ORIENTED DIALOGUES

(71) Applicant: Salesforce, Inc., San Francisco, CA (US)

(72) Inventors: Govardana Sachithanandam Ramachandran, Palo Alto, CA (US); Kazuma Hashimoto, Menlo Park, CA (US); Caiming Xiong, Menlo Park, CA (US); Richard Socher, Menlo Park, CA (US)

(73) Assignee: Salesforce, Inc., San Francisco, CA (US)

( * ) Notice: Subject to any disclaimer, the term of this patent is extended or adjusted under 35 U.S.C. 154(b) by 1098 days.

(21) Appl. No.: 17/500,855

(22) Filed: Oct. 13, 2021

(65) Prior Publication Data

US 2022/0036884 A1 Feb. 3, 2022

Related U.S. Application Data

(63) Continuation-in-part of application No. 17/105,262, filed on Nov. 25, 2020, now Pat. No. 11,922,305.
(Continued)

(51) Int. Cl.
*G06N 3/047* (2023.01)
*G06F 18/21* (2023.01)
(Continued)

(52) U.S. Cl.
CPC ......... *G06N 3/047* (2023.01); *G06F 18/2155* (2023.01); *G06F 18/217* (2023.01);
(Continued)

(58) Field of Classification Search
CPC .......... G06N 3/047; G06N 3/044; G06N 3/08; G06F 18/217; G06F 18/2155; G06F 18/21326

See application file for complete search history.

(56) References Cited

U.S. PATENT DOCUMENTS

| | | |
|---|---|---|
| 9,589,565 B2 | 3/2017 | Daniel et al. |
| 2018/0052825 A1 | 2/2018 | Chase et al. |

(Continued)

FOREIGN PATENT DOCUMENTS

| | | |
|---|---|---|
| CN | 108804611 A | 11/2018 |
| CN | 110866101 A | 3/2020 |
| CN | 111046157 A | 4/2020 |

OTHER PUBLICATIONS

International Search Report and Written Opinion for PCT/US2022/014034, dated May 27, 2022, 9 pages.

(Continued)

*Primary Examiner* — Markus A. Vasquez
(74) *Attorney, Agent, or Firm* — Haynes and Boone, LLP

(57) ABSTRACT

Embodiments described herein provide safe policy improvement (SPI) in a batch reinforcement learning framework for a task-oriented dialogue. Specifically, a batch reinforcement learning framework for dialogue policy learning is provided, which improves the performance of the dialogue and learns to shape a reward that reasons the invention behind human response rather than just imitating the human demonstration.

20 Claims, 18 Drawing Sheets

Related U.S. Application Data

(60) Provisional application No. 63/148,861, filed on Feb. 12, 2021, provisional application No. 63/034,653, filed on Jun. 4, 2020.

(51) Int. Cl.
  G06F 18/214 (2023.01)
  G06N 3/044 (2023.01)
  G06N 3/08 (2023.01)
  G06F 18/2132 (2023.01)

(52) U.S. Cl.
  CPC ............... G06N 3/044 (2023.01); G06N 3/08 (2013.01); *G06F 18/21326* (2023.01)

(56) References Cited

U.S. PATENT DOCUMENTS

| | | |
|---|---|---|
| 2019/0115027 A1 | 4/2019 | Pararth et al. |
| 2021/0150151 A1* | 5/2021 | Xu ................. G06N 3/0464 |

OTHER PUBLICATIONS

Budzianowski et al., "Multiwoz—a large-scale multi-domain wizard-of-oz dataset for task-oriented dialogue modelling," arXiv preprint arXiv: 1810.00278, Sep. 29, 2018, 14 pages.
Chen et al., "Semantically conditioned dialog response generation via hierarchical disentangled self-attention," arXiv preprint arXiv: 1905.12866, Jun. 9, 2019, 14 pages.
Christiano et al., "Deep reinforcement learning from human preferences," In Advances in Neural Information Processing Systems, Jul. 13, 2017, 17 pages.
Devlin et al., "Bert: Pre-training of deep bidirectional transformers for language understanding," arXiv preprint arXiv:1810.04805, Oct. 11, 2018, 14 pages.
Hosseini-Asl et al., "A simple language model for task-oriented dialogue," arXiv preprint arXiv:2005.00796, Jul. 7, 2020, 22 pages.
Jaques et al., "Way off-policy batch deep reinforcement learning of implicit human preferences in dialog," arXiv preprint arXiv: 1907.00456, Jul. 8, 2019, 16 pages.
Mehri et al., Structured fusion networks for dialog, arXiv preprint arXiv:1907.10016, Jul. 23, 2019, 12 pages.
Norouzi et al., "Reward augmented maximum likelihood for neural structured prediction," In Advances In Neural Information Processing Systems, Sep. 1, 2016, 11 pages.
Paul et al., "Feature selection as causal inference: Experiments with text classification," In Proceedings of the 21st Conference on Computational Natural Language Learning (CoNLL 2017), Aug. 3-Aug. 4, 2017, pp. 163-172.
Rastogi et al., "Towards scalable multi-domain conversational agents: The schema-guided dialogue dataset," arXiv preprint arXiv: 1909.05855, Sep. 12, 2019, 11 pages.
Schulman et al., "Trust region policy optimization," In International conference on machine Learning, Feb. 19, 2015, 16 pages.
Sutton et al., "Reinforcement learning: An introduction," MIT press, 2018, 548 pages.
Thananjeyan et al., "Safety augmented value estimation from demonstrations (saved): Safe deep model-based rl for sparse cost robotic tasks," IEEE Robotics and Automation Letters, vol. 5, No. 2, May 16, 2020, 14 pages.
Thomas et al., "Data efficient off-policy policy evaluation for reinforcement learning," In International Conference on Machine Learning, Apr. 4, 2016, 37 pages.
Wen et al., "A networkbased end-to-end trainable task-oriented dialogue system," arXiv preprint arXiv:1604.04562, Apr. 15, 2016, 11 pages.
Zhang et al., "Find or Classify? Dual Strategy for Slot-Value Predictions on Multi-Domain Dialog State Tracking", ARXVIV. Org, Cornell University Library, 201 Olin Library, Cornell University Ithaca, NY 14853, Oct. 8, 2019, 9 pages, XP081512326.
Zhang et al., "Task-oriented dialog systems that consider multiple appropriate responses under the same context," arXiv preprint arXiv:1911.10484, Dec. 2, 2019, 8 pages.
Zhao et al., "Rethinking action spaces for reinforcement learning in end-to-end dialog agents with latent variable models," arXiv preprint arXiv:1902.08858, Apr. 15, 2019, 12 pages.
Ziebart et al., "Maximum entropy inverse reinforcement learning," Proceedings of the Twenty-Third AAAI Conference on Artificial Intelligence, 2008, pp. 1433-1438.
Liu et al., "Dialogue Policy Optimization Based on KL-GAN-A2C Model", 16th International Computer Conference in Wavelet Active Media Technology and Information Processing, 2019, pp. 417-420.
Liu et al., . "Iterative Policy Learning in End-to-End Trainable Task-Oriented Neural Dialog Models", 2017 IEEE, Automatic Speech Recognition and Understanding Workshop., 2017, pp. 482-489.
Su et al., "On-line Active Reward Learning for Policy Optimisation in Spoken Dialogue Systems", arXiv:1605.07669v2, Jun. 2, 2016, 11 pages.
Takanobu et al., "Guided Dialog Policy Learning: Reward Estimation for Multi-Domain Task-Oriented Dialog", arXiv: 1908.10719v1, Aug. 28, 2019, 13 pages.
Zhang, J., et al., "Find or Classify? Dual Strategy for Slot-Value Predictions on Multi-Domain Dialog State Tracking," University of Illinois at Chicago, Zhejiang University, arXiv preprint arXiv:1910.03544v1 [cs.CL], Oct. 8, 2019, 12 pages.

* cited by examiner

Goal 122: {"train": {"info": {"leaveat": "09:00", "destination": "broxbourne", "day": "sunday", "departure": "cambridge"}, "fail_info": {}, "book": {"invalid": true, "people": "8"}, "fail_book": {}}}

Turn-1
- User (125a / 126a): i am looking for a train , the train should leave after [value_leave] and should go to [value_destination] .
- Agent (127a): [train] [request] day what day will this be on ?

Turn-2
- User (125b / 126b): on [value_day] .
- Agent (127b): [train] [offerbook] leave id [value_id] leaves at [value_leave] would you like me to book it ?

Turn-3
- User (125c / 126c): yes please . i need that booked for [value_people] people .
- Agent (127c): [train] [offerbooked] reference people [general] [reqmore] i was able to get you [value_people] tickets , your reference number is [value_reference] . can i help you with anything else ?

Turn-4
- User (125d / 126d): no , thank you , that is all for now . have a great day .
- Agent (127d): [general] [welcome] [bye] you are welcome . have a great trip !

Receive a training dataset comprising a plurality of dialogue rollouts generated by a latent stochastic behavior policy 502

Input only belief states from the observations to the neural model in a first pass 504

Generate, by a neural model, a first predicted action distribution based on a current state of the respective dialogue according to a target policy 506

Compute a first discounted sum of future reward based on a discount parameter and a reward function of actions and states of the respective dialogue according to the latent behavior policy 508

Compute a first loss objective based on a first expectation of the first discounted sum of future reward and the first predicted action distribution during the first pass 510

Input full observations to the neural model in a second pass 512

Generate, by the neural model, a second predicted action distribution based on a current observation according to a target policy 514

```
                                 ┌─────┐
                                 │ 514 │
                                 └──┬──┘
                                    ▼
┌─────────────────────────────────────────────────────────────────────┐
│ Compute a second discounted sum of future reward based on           │
│ the discount parameter and the reward function for a specific       │
│ rollout, wherein the second discounted sum of future reward         │
│ is a collapsed near-deterministic approximation of the first        │
│ discounted sum of future reward 516                                 │
└─────────────────────────────────┬───────────────────────────────────┘
                                  ▼
┌─────────────────────────────────────────────────────────────────────┐
│ Compute a second loss objective based on a second                   │
│ expectation of the second discounted sum of future reward           │
│ and the second predicted action distribution, wherein the           │
│ second expectation is taken over an average of the                  │
│ observations across the training dataset during the second          │
│ pass 520                                                            │
└─────────────────────────────────┬───────────────────────────────────┘
                                  ▼
┌─────────────────────────────────────────────────────────────────────┐
│ Compute a combined loss objective by summing the first loss         │
│ objective and the second loss objective 522                         │
└─────────────────────────────────┬───────────────────────────────────┘
                                  ▼
┌─────────────────────────────────────────────────────────────────────┐
│ Update the neural model based on the combined loss objective,       │
│ subject to a condition that a KL-divergence between the latent      │
│ stochastic behavior policy and the target policy conditioned on     │
│ the current state of the respective dialogue is less than a pre-    │
│ defined hyperparameter 524                                          │
└─────────────────────────────────────────────────────────────────────┘
```

*FIG. 5B*

Algorithm 1 CASPI

Sub-sample K-folds of train and val set $(D_T, D_V) \sim D$
for $\forall (D_T, D_V)$ do
   learn ToD in supervised setting by optimizing objective:
   $-\min \mathbb{E}_{a,s \sim D_T} \log(\pi_m(\hat{a}|s))$
   for $\forall$ epoch do
     Predict on the valset $D_V$ and add it to the dataset, $D_P$ for pairwise causal learning
     $D_P = D_P \cup \tau | \tau \sim \Pi_M$
   end for
end for
repeat
   Sample pair of rollouts $(\tau^1, \tau^2) \sim D_P$
   Learn for $R(.)$ network by optimizing for objective Eqn: 5
until Convergence using data $D_P$
repeat
   Optimize for policy $\pi_e$ using objective 3
until Convergence using data $D$

*FIG. 6A*

Causal-aware Safe Policy Improvement for Task-oriented dialogue

| Model | Belief State Type | System Action Type | System Action Form | Inform (%) | Success (%) | BLEU | Combined Score |
|---|---|---|---|---|---|---|---|
| HDSA (Chen et al., 2019) | oracle | generated | graph | 82.9 | 68.9 | 23.6 | 99.50 |
| LaRL(Zhao et al., 2019) | oracle | generated | graph | 82.8 | 79.2 | 12.8 | 93.80 |
| DAMD(Zhang et al., 2019) | oracle | generated | span | 89.2 | 77.9 | 18.6 | 102.15 |
| SOLONIST(Zhang et al., 2019) | oracle | generated | span | 89.6 | 79.3 | 18.3 | 102.75 |
| MarCo(Zhang et al., 2019) | oracle | generated | span | 92.3 | 78.6 | 20.02 | 105.47 |
| HDNO(Zhang et al., 2019) | oracle | generated | span | 96.4 | 84.7 | 18.85 | 109.40 |
| CASPI(DAMD), $M_{soft}(act)$ | oracle | generated | span | 96.8 | 87.3 | 19.10 | 111.15 |

FIG. 8

Causal-aware Safe Policy Improvement for Task-oriented dialogue

| Model | Pre-trained model | Inform % | Success % | BLEU | Combined Score |
|---|---|---|---|---|---|
| DAMD | No | 72.79 | 60.45 | 16.93 | 83.55 |
| DAMD + multi-action | No | 76.33 | 64.35 | 17.96 | 88.30 |
| SimpleTOD | Yes | 84.4 | 70.10 | 15.01 | 92.26 |
| SOLOIST | Yes | 85.5 | 72.90 | 16.54 | 95.74 |
| MinTL-BART | Yes | 84.88 | 74.91 | 17.89 | 97.79 |
| CASPI(DAMD), $M_{soft}(act)$ | No | 89.1 | 76.1 | 18.08 | 100.68 |
| CASPI(MinTL), $M_{soft}(act)$ | Yes | 94.59 | 85.59 | 17.96 | 108.05 |
| CASPI(MinTL), $M_{hard}(act)$ | Yes | 93.79 | 84.88 | 17.47 | 106.81 |

FIG. 9

| Model | 5% | | | 10% | | | 20% | | |
|---|---|---|---|---|---|---|---|---|---|
| | Inform | Success | BLEU | Inform | Success | BLEU | Inform | Success | BLEU |
| MD-Sequicity | 49.40 | 19.70 | 10.30 | 58.10 | 34.70 | 11.40 | 64.40 | 42.10 | 13.00 |
| DAMD | 56.60 | 24.50 | 10.60 | 62.00 | 39.40 | 14.50 | 68.30 | 42.90 | 11.80 |
| MinTL | 75.48 | 60.96 | 13.98 | 78.08 | 66.87 | 15.46 | 82.48 | 69.57 | 13.00 |
| CASPI(MinTL), $M_{soft}(resp)$ | 87.69 | 71.17 | 13.51 | 82.08 | 72.27 | 14.10 | 89.39 | 78.58 | 15.16 |
| CASPI(MinTL), $M_{hard}(resp)$ | 89.69 | 69.47 | 13.33 | 92.59 | 78.58 | 14.48 | 94.19 | 83.28 | 13.65 |

FIG. 10

| Train data | Inform % | Success % | BLEU |
|---|---|---|---|
| 100% | 96.8 | 87.3 | 19.1 |
| 75% | 94.2 | 81.4 | 19.2 |
| 50% | 91.2 | 76.6 | 17.7 |
| 25% | 91.5 | 68.3 | 15 |

FIG. 11

| user | i need to find a [value_type] that has free parking . |
|---|---|
| agent | sure i can help with that . what area will you be staying in ? |
| user | in the [value_area] . i more specifically am looking for a [value_type] with a [value_stars] star rating in that area |
| agent-gt | [value_name] is a [value_stars] star [value_type] located in the [value_area] has both free parking and wifi . what days are you interested in staying there ? can i book for you ? |
| MinTL | i have [value_choice] [value_type] in the [value_area] with a [value_stars] star rating . it is [value_name] . would you like me to book it for you ? |
| CASPI(MinTL) | i have [value_choice] [value_type] in the [value_area] . [value_name] is [value_price] and [value_stars] stars . would you like me to book it ? |
| DAMD | i have [value_choice] options for you . is there a certain area you are looking for ? |
| SimpleTOD | there are no guesthouses with a [value_count] star rating in the [value_area] , but there are [value_count] star guesthouses with free parking in the [value_pricerange] to [value_pricerange] price range |

| | R(a,s,g) |
|---|---|
| Goal | {"train": {"info": {"leaveat": "09:00", "destination": "broxbourne", "day": "sunday", "departure": "cambridge"}, "fail_info": {}, "book": {"invalid": true, "people": "8"}, "fail_book": {}}} | |
| Turn-1 User | i am looking for a train . the train should leave after [value_leave] and should go to [value_destination] | |
| Turn-1 Agent | [train] [request] day what day will this be on ? | 0.0614 |
| Turn-2 User | on [value_day] | |
| Turn-2 Agent | [train] [offerbook] leave id [value_id] leaves at [value_leave] would you like me to book it ? | 0.1298 |
| Turn-3 User | yes please . i need that booked for [value_people] people | |
| Turn-3 Agent | [train] [offerbooked] reference people [general] [reqmore] i was able to get you [value_people] tickets . your reference number is [value_reference] . can i help you with anything else ? | 0.2295 |
| Turn-4 User | no , thank you , that is all for now . have a great day . | |
| Turn-4 Agent | [general] [welcome] [bye] you are welcome . have a great trip ! | 0.0249 |

FIG. 15

☐ Greedy agent
┆ Cautious agent user   help me reserve a taxi please
agent  okay , what is your departure site ?
user   i will be leaving from [value_departure]
agent  i have booked you a [value_car] . the contact number is [value_phone] .
user   i also need to book a taxi to get to the attraction by 03:30 and i will need the contact number and car type .
agent  i have booked a taxi for you , the contact number is [value_phone] , the car type is a [value_car] , the address is [value_address] , the phone number is [value_reference] , the postcode is [value_postcode] , the total fee is [value_price] , the reference number is [value_reference] .

FIG. 16

SYSTEMS AND METHODS FOR SAFE POLICY IMPROVEMENT FOR TASK ORIENTED DIALOGUES

CROSS-REFERENCES

The present disclosure is a non-provisional of and claims priority to U.S. provisional application No. 63/148,861, filed on Feb. 12, 2021.

The present disclosure is also a continuation-in-part of and claims priority to co-pending and commonly-owned U.S. nonprovisional application Ser. No. 17/105,262, filed Nov. 25, 2020, which is a non-provisional application of and claims priority under 35 U.S.C. 119 to U.S. provisional application No. 63/034,653, filed on Jun. 4, 2020.

All of the aforementioned applications are hereby expressly incorporated by reference herein in their entirety.

TECHNICAL FIELD

The present disclosure relates generally to machine learning models and neural networks, and more specifically, to safe policy improvement for task-oriented dialogues.

BACKGROUND

Neural networks have been used to generate conversational responses and thus conduct a dialogue with a human user to fulfill a task. For example, a human user can engage in a conversation with an intelligent assistant to book travel tickets, make restaurant reservations, and/or the like. To fulfill a complex task, the intelligent assistant usually needs to learn to collectively complete multiple subtasks. For example, the assistant needs to reserve a hotel and book a flight so that there leaves enough time for commute between arrival and hotel check-in. For the intelligent assistant to learn such complex tasks, the intelligent assistant learns a dialogue policy to select among subtasks or options at a given time, which is often accompanied by a state tracker that tracks the status of the subtask.

Task-oriented dialogue systems are usually learnt from offline data collected using human demonstrations (e.g., past dialogues, etc.), but collecting diverse demonstrations and annotating them can be expensive. In addition, such offline task-oriented dialogue systems often involve disparate systems, such as a belief states tracker, dialogue policy management, response generation, etc. These disparate systems may induce stochasticity and its associated challenges in addition to the need for sample efficiency in effective dialogue policy learning.

Therefore, there is a need for efficient policy learning in task-oriented dialogue systems.

BRIEF DESCRIPTION OF THE DRAWINGS

FIG. 1B provides a diagram illustrating an example task-oriented dialogue of multiple dialogue turns between the user and the agent shown in FIG. 1A, according to one embodiment described herein.

FIGS. 5A-5B provide an example logic flow diagram illustrating a method of MDP-based safe policy improvement, according to an embodiment.

FIG. 6A provides an example pseudo-code segment illustrating an algorithm for causal aware safe policy improvement (CASPI), according to an embodiment described herein.

FIGS. 8-16 provide data charts showing example performance comparison of the safe policy improvement with existing methods, according to one embodiment.

Figure 1A:
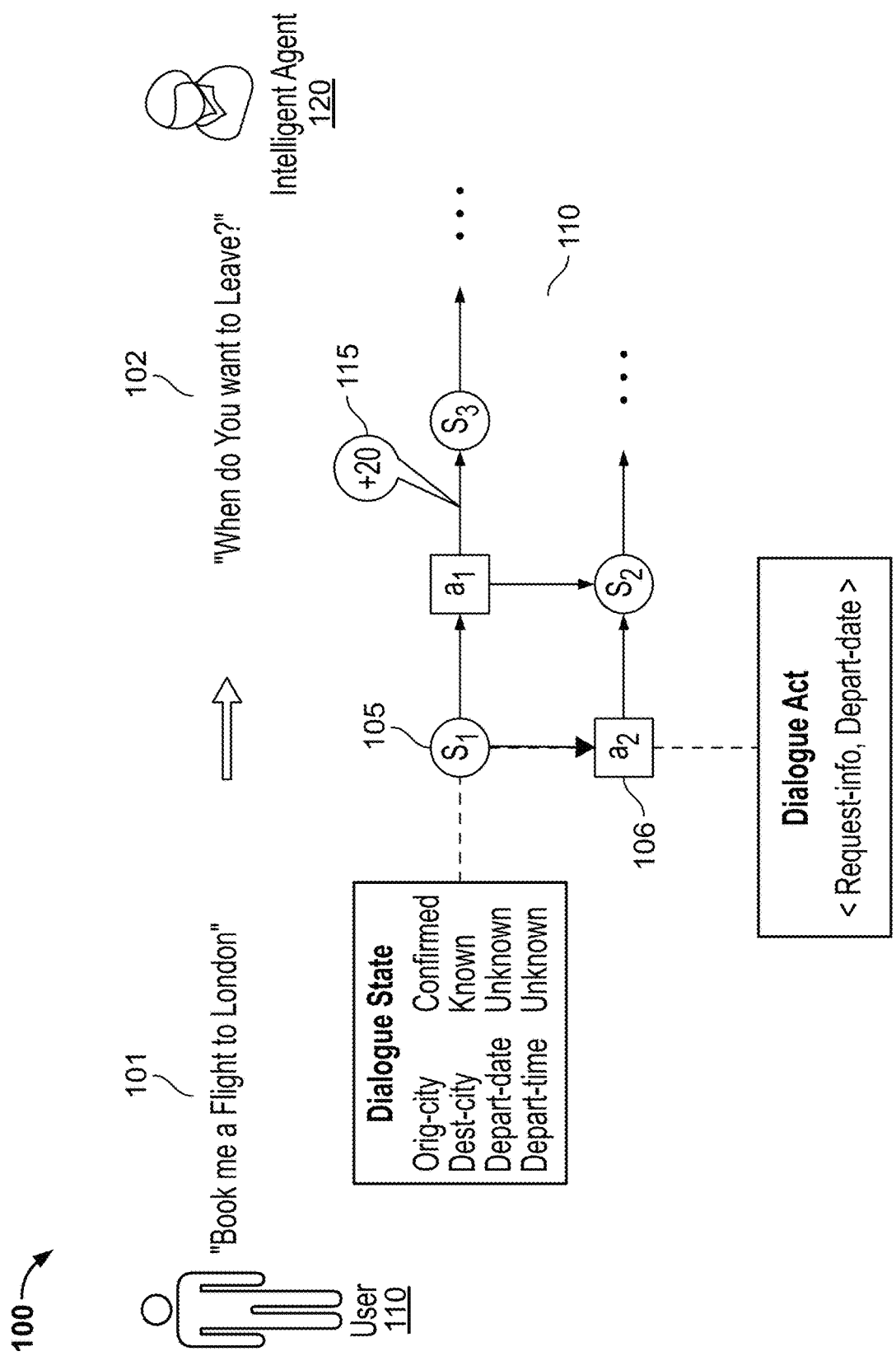
FIG. 1A provides a diagram illustrating an example task-oriented dialogue described by a Markov Decision Process upon which safe policy improvement may be applied, according to one embodiment described herein.

In the figures and appendix, elements having the same designations have the same or similar functions.

DETAILED DESCRIPTION

Task-oriented dialogue systems are usually learnt from offline data collected using human demonstrations (e.g., past dialogues, etc.), but collecting diverse demonstrations and annotating them can be expensive. In addition, such offline task-oriented dialogue systems often involve disparate systems, such as a belief states tracker, dialogue policy management, response generation, etc. These disparate systems may induce stochasticity and its associated challenges in addition to the need for sample efficiency in effective dialogue policy learning.

Some existing systems adopt off-policy based reinforcement learning (Batch-RL) methods in solving complex task. Batch-RL methods usually use historically annotated data instead of a simulator, which may be sample efficient because inexpensive simulator are usually readily available to sample data on-policy. These techniques, however, may not perform as efficient due to the nature of dialogue policy learning. For example, off-policy based learning may often require an estimation of behavior policy for a given state, e.g., a belief state, of the underlying Markov Decision Process (MDP). In real life, a belief state does not always capture the true state of the MDP, while the MDP latent state such as prosody, among others, may induce stochasticity in the agent response at each turn. In addition, semantic information may be lost when dialogue act is generated to a natural language text. The use of mere policy imitation for dialogue act may be insufficient to provide a fair reasoning to a particular outcome, if each constituent of composite action is focused on equally.

In view of the need for efficient policy learning in task-oriented dialogue systems, embodiments described herein provide safe policy improvement in a batch reinforcement learning framework for a task-oriented dialogue. Specifically, a dialogue policy is trained on the dialogue rollout generated by a latent behavior policy with performance guarantee, e.g., by reinforcing that the performance of a new policy is at least superior to the old behavior policy for a positive gap. A training loss objective is then defined by minimizing an expected discounted sum of future reward, subject to a condition that the KL divergence between the old behavior policy and the target policy is no greater than a pre-defined hyper-parameter. In this way, the bias in training over rollouts of another policy may be much reduced, thus resulting in "safe" policy improvement.

In addition, pairwise causal reward learning is provided to shape a reward that reasons the intention of human utterance instead of mimicking a human demonstration in a batch reinforcement setting. A combination of the safe policy improvement and the pairwise causal reward learning may achieve sample efficiency in learning complex tasks.

As used herein, the term "network" may comprise any hardware or software-based framework that includes any artificial intelligence network or system, neural network or system and/or any training or learning models implemented thereon or therewith.

As used herein, the term "module" may comprise hardware or software-based framework that performs one or more functions. In some embodiments, the module may be implemented on one or more neural networks.

FIG. 1A provides a diagram 100 illustrating an example task-oriented dialogue described by a Markov Decision Process upon which safe policy improvement may be applied, according to one embodiment described herein. Diagram 100 shows a dialogue turn of a task-oriented dialogue between a user 110 and an intelligent agent 120. For example, the user 110 may provide a user utterance 101 "Book me a flight to London," and the agent 120 may respond with a system response "when do you want to leave?" 120. The dialogue between the user 110 and the intelligent agent 120 may form a task-oriented dialogue to complete the task of planning a trip to London.

The task-oriented dialogue may be modeled as a Markov Decision Process (MDP), shown by the connected graph structure 110. The MDP is described by the tuple $\{S, A, P, R, \gamma\}$ of states S, actions A, transition probability P, reward R, and a discount factor $\gamma$. The states S are dialogue contexts that are the agent's interpretation of the environment. Actions A are possible communication behaviors that are available to the agent at each state. Transition probability P defines the probability that the states S transitions to another set of states S' given the actions A. For example, the intelligent agent 120 at time step t with state $s_t$ may perform a composite action $a_t$ as per a target policy $\pi_e(a_t|s_t)$ on the environment, with transition probabilities to the next state $P(S'|S, A)$. For example, in the state 105 $s_1$ after user utterance 101, the original city is confirmed (per user location), the destination city "London" is obtained from the user utterance 101, but the departure date and departure time are unknown. Thus, a dialogue act 106 may be performed according to the target policy $\pi_e(a_2|s_1)$ to request information on the departure date, with the agent 120 replying to user 110 with the system response 102. After the dialogue act 106, the dialogue state transitions from state $s_1$ to $s_2$.

A latent reward function, R(a, s) with a discount factor $\gamma \in [0, 1]$ is associated with the MDP 120, defining a reward value given the set of states and actions. For example, a positive reward r 115 of "20" is assigned given the state $s_1$ and dialogue act $a_1$. In one embodiment, the latent reward function R(a, s) and the discount factor $\gamma$ may be pre-defined for the MDP. In another embodiment, the latent reward function R(a, s) and the discount factor $\gamma$ may be learnt through the pairwise causal reward learning mechanism described in relation to FIG. 3.

In one embodiment, given the reward function and the discount factor, the objective is to optimize for the target policy $\pi_e(a_t|s_t)$, which maximizes the expected discounted sum of future reward on the MDP, which may be written as the state-action function $Q_{\pi_e}(a_t, s_t) = E_{\pi_e}[\Sigma_{t'}^T \gamma^{t'-t} r(s_{t'}, a_{t'})]$, where $r(s_{t'}, a_{t'})$ is the future reward at future time t', which can be similarly defined with the reward function R(a,s). To achieve this objective, a "safe" policy improvement mechanism is described in relation to FIGS. 2 and 5.

FIG. 1B provides a diagram illustrating an example task-oriented dialogue of multiple dialogue turns between the user and the agent shown in FIG. 1A, according to one embodiment described herein. The dialogue shown in FIG. 1B corresponds to a goal 122, e.g., relating to book a train that departs at a certain time leaving for a certain destination. The dialogue includes 4 dialogue turns, each of which includes a delexicalized user utterance 125a-d, an agent dialogue act 126a-d, and a delexicalized agent utterance/response 127a-d, respectively. The 4 dialogue turns may show that the use of mere policy imitation for dialogue-act may fall short of reasoning on the outcome, but rather focus on each constituent of composite action equally. For example, Turns 3 and 4 are rich in semantic information: Turn 3 provides the key to the transaction of the booking process, while Turn 4 of the least use in the success of the conversation gets an equal weight as other semantically rich turn. Such specifics are lost in the imitation policy learning.

Figure 2:
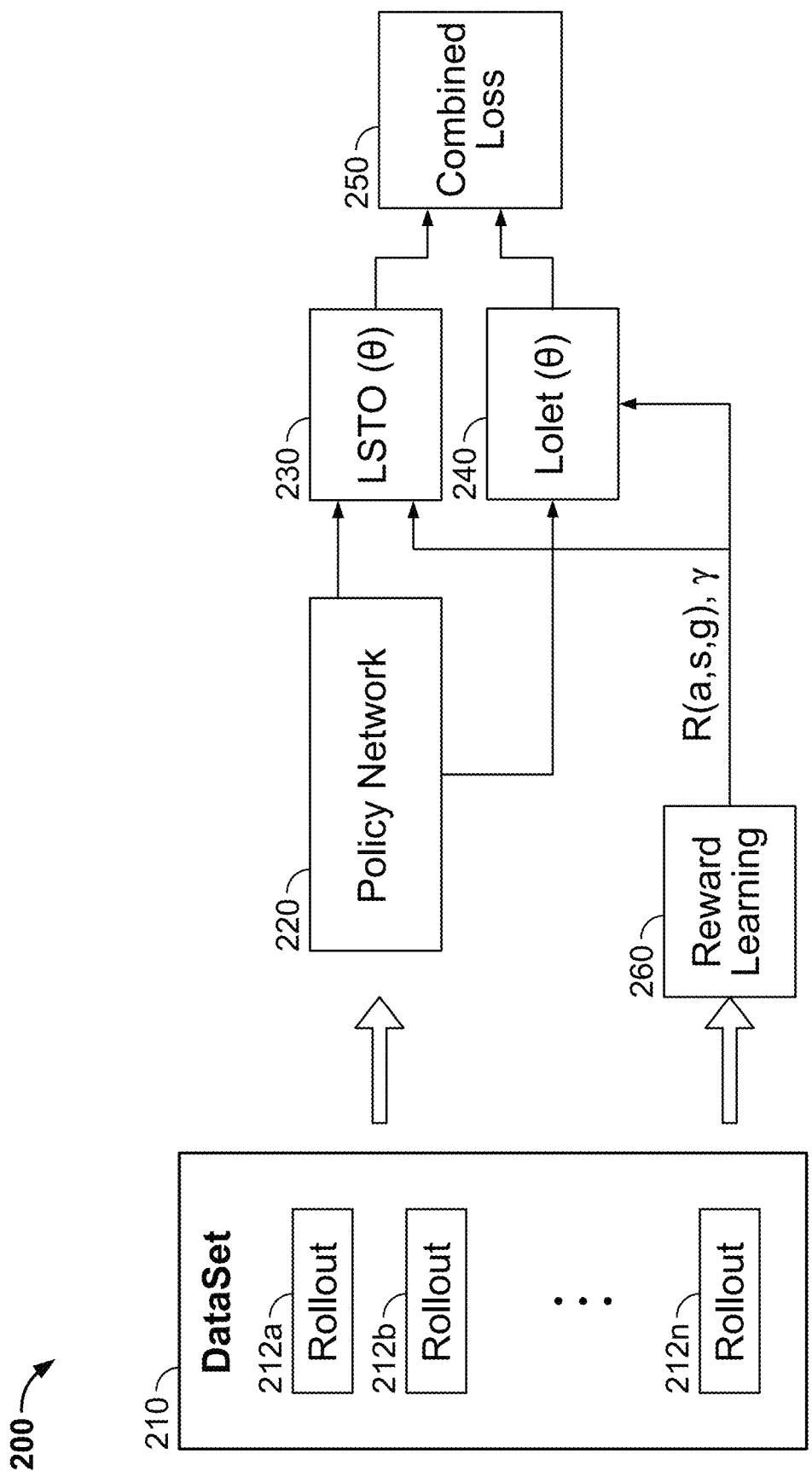
FIG. 2 provides a simplified diagram illustrating an example architecture of training a policy network with reward learning, according to one embodiment described herein.

FIG. 2 provides a simplified diagram 200 illustrating an example architecture of training a policy network with reward learning, according to one embodiment described herein. Diagram 200 shows that a training dataset 210 is input to a policy network 220, and a reward learning module 260. Specifically, the dataset 220 includes a plurality of rollouts 212a-n from dialogues. The rollouts 212a-n may be generated by human agents performing actions based on a latent stochastic behavior policy.

For example, in offline Batch-RL, the intelligent agent does not get to interact with the environment. Instead, the set of offline data D 210 logged by human agents performing actions based on a latent stochastic behavior policy $\pi_b$ can be obtained. The set of offline data D 210 includes a plurality of rollouts 212a-n of a dialogue, each denoted by $\tau^i \in D$. Each rollout $\tau^i = ((o_0^i, a_0^i), \ldots, (o_{T-1}^i, a_{T-1}^i))$, where each $o_t$ is the observation at turn t, composing of $o_t = (b_t, u_t^u, u_{t-1}^a)$. Here b is the belief state of the agent at turn t, $u_t^u$ and $u_{t-1}^a$ are the user and agent utterance at time t and t−1, respectively. Thus, batch-RL entails training a policy on rollouts generated by the latent behaviour policy.

However, directly optimizing a training objective, e.g., the discounted sum of future reward, on the rollouts of another policy, leads to a large bias in the value function estimation, poor generalization characteristic, and sample inefficiency. Thus, a "safe" policy improvement may be implemented, such that the new policy performance is bounded compared to the old policy. Specifically, the value function of the new target policy $\pi_e$ and the value function of the latent behavior policy $\pi_b$ satisfies: $\Pr(V^{\pi_e} \geq V^{\pi_b} - \zeta) \geq 1 - \delta$, where $V^{\pi_e}$ and $V^{\pi_b}$ are value functions of the target policy and behavior policy, respectively. Here $1-\delta$ and $\zeta$ are the high probability and approximation meta-parameters, respectively.

Thus, based on the input observations $o_t = (b_t, u_t^u, u_{t-1}^a)$ from the dataset 210, the policy network 220 may generate a target act distribution $\pi_e(s_t; \theta)$ according to a target policy $\pi_e$ and the parameter $\theta$ of the policy network. Then, a stochastic loss objective $L_{sto}(\theta)$ may be computed at loss module 230 for the safe policy improvement:

$$L_{sto}(\theta) = -E_{s \sim p^{\pi_b}, a \sim \pi_b}\left[\frac{\pi_e(s_t; \theta)}{\pi_b(s_t; \theta)} Q^{\pi_e}(s_t, a)\right] \quad (1)$$

$$\text{s.t. } E_{s \sim p^{\pi_b}}[D_{KL}(\pi_b(s_t) \| \pi_e(s_t))] \leq \eta$$

In some implementations, the stochastic loss objective $L_{sto}(\theta)$ may be computed using the belief state $b_t$ to replace $s_t$ in Eq. (1). The belief state is a stochastic variable as it does not capture all information. The policy $\pi_e(b_t; \theta)$ is computed for optimizing the stochastic loss function.

Traditionally, the update mechanism provided in Schulman et al., Trust Region Policy Optimization, in Proceedings of International conference on machine learning, pp. 1889-1897, 2015, provides bounded errors as long as the constraints of (1) are met, where $D_{KL}(.\|.)$ is the KL divergence and $\eta$ is a hyper-parameter. However, the Schulman update rule requires access to the behavior policy $\pi_b(a_t|s_t)$ which is intractable to estimate. Instead, the behaviour policy conditioned on the belief state $b_t$ $\pi_b(b_t)$ may be estimated as against $s_t$ in (1), which results in a stochastic behavior policy. The belief state $b_t$ is part of the observation of at turn t that can be obtained from a specific rollout in the dataset D 210. Thus, in one implementation, when computing the stochastic loss objective in (1), $\pi_b(s_t)$ may be approximated by $\pi_b(b_t)$ which can be obtained from the rollouts in the dataset 210. For example, the estimation of $\pi_b(b_t)$ may be given by the number of occurrence of a dialogue act $a_t$ given $b_t$ divided by the total number of act $a_t$ given $b_t$.

Based on availability of more evidence of the observation $o_t$ (which contains more information than the belief state $b_t$), the mode of the policy may collapse to a near deterministic action. To factor this into the policy learning, an additional deterministic loss may be computed at loss module 240:

$$L_{det}(\theta) = -E_{(o_t, a_t) \sim D}[G(\tau, t)\log\log \pi_e(a_t|o_t)], \quad (2)$$

where $G(\tau^i, t) = \Sigma_{t'=t}^T \gamma_{\theta_1}^{t'-t} R_{\theta_2}(g^i, s_{t'-t}, a_{t'})$ is the discounted sum of future reward for a single trajectory/episode, e.g., referred to as rollout $\tau^i$ with goal $g^i$ from time step t; the discount factor is a function of parameter $\theta_1$; $R_{\theta_2}(g, s, a)$ is reward function of the states, actions and the goal, given parameter $\theta_2$. The $R_{\theta_2}(g, s, a)$ and discount factor $\gamma_{\theta_1}^{t'-t}$ are learnt by the reward learning module 260. Hence, the combined loss module 250 computes the policy optimization loss function as:

$$L(\theta) = L_{sto}(\theta) + L_{det}(\theta) \quad (3)$$

In one embodiment, the network 220 may be trained using just the stochastic loss $L_{sto}(\theta)$, or just the deterministic loss $L_{det}(\theta)$. Alternatively, the network 220 is trained by the sum $L(\theta)$ of the two losses as described below.

In one embodiment, the combined loss module 250 may achieve the loss function (3) via two forward passes on the policy network 220. For example, in the first pass, only the belief state $\{b_t\}$ from the dataset 210 are input to the policy network 220 such that the first pass captures the stochasticity of the policy conditioned only on the belief state $\{b_t\}$. During the first pass, the stochastic loss module 230 computes the stochastic loss in (1) using the action distribution output $\pi_e(s_t; \theta)$ from the policy network 220. In the second pass, all the observation information $\{o_t = (b_t, u_t^u, u_{t-1}^a)\}$ from the dataset 210 is input to the policy network 220 to get the action distribution $\pi_e(o_t)$ for the deterministic loss module 240 to compute the deterministic loss in (2). The second pass collapses the mode given other latent information of the state, such as $u^u$ and $u^a$. After the two passes, the combined loss module 250 compute the loss objective in (3), which may be used to update the policy network 220 via backpropagation. Further details of the work flow for implementing the safe policy improvement with policy network 220 can be found in relation to FIGS. 5A-5B.

As shown above, the stochastic loss objective (1) for safe policy improvement requires the Q-function of the latent behaviour policy, which can be estimated using Monte Carlo sampling on the dataset D, given the reward R(s, a, g) is known. The reward learning module 260 provides a mechanism to learn a reward that is causally reasoned on the intention of the human demonstrator. The reward learning module 260 provides the reward function R(s, a, g) and the discount parameter $\gamma$ to the stochastic loss module 230 and the deterministic loss module 240. Further details of the reward learning module 260 is described below in relation to FIG. 3.

Figure 3A:
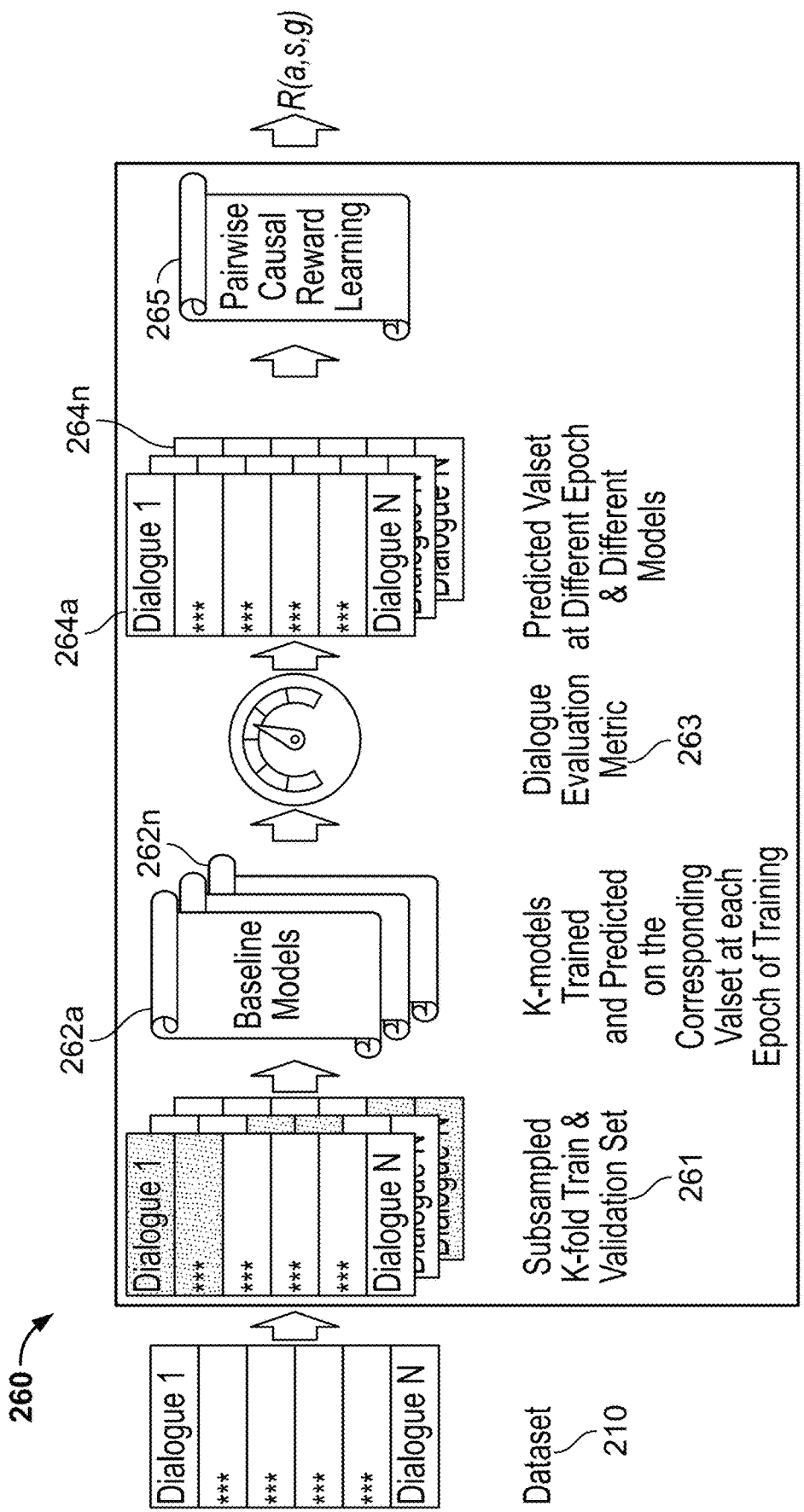
FIG. 3A provides a simplified diagram illustrating aspects of the workflow inside the reward learning module shown in FIG. 2, according to one embodiment described herein.

FIG. 3A provides a simplified diagram illustrating aspects of the workflow inside the reward learning module 260 shown in FIG. 2, according to one embodiment. Specifically, dialogue policy learning is usually accompanied by a metric M, to evaluate the performance of the learnt policy. Though these metrics could serve as a proxy for a reward function, directly combining them into learning the reward can be challenging. For example, these metric functions usually return a metric score for the entire dialogue. Given the complex state-action space of the dialogue management system, the scores at the dialogue level are under-specified for rewarding an action performed at each dialogue turn.

To address this under-specified feedback, a preference learning may be adapted from an online setting to an offline setting. For example, the preference learning was originally proposed in Paul et al., Feature selection as causal inference: Experiments with text classification, in Proceedings of the 21st Conference on Computational Natural Language Learning, pages 163-172, 2017. The reward can be parametrized for every timestep t, as $r(o_t, a_t, g)$. Given a pair of rollouts $\tau^1, \tau^2 \in D$ with actions for each state in the rollouts sampled from the learnt policies $\pi_e^1$ and $\pi_e^2$, respectively, let $P[\tau^1 \succ \tau^2]$ be the probabilistic measure that captures the preference of $\pi_e^1$ over $\pi_e^2$, then this preference is true when the sum of rewards of each dialogue rollout of the two rollouts satisfies:

$$\Sigma_{t=0}^T R(s_t, a_t|(s_t, a_t) \in \tau^1) > \Sigma_{t=0}^T R(s_t, a_t, g|(s_T, a_t) \in \tau^2)$$

Figure 3B:
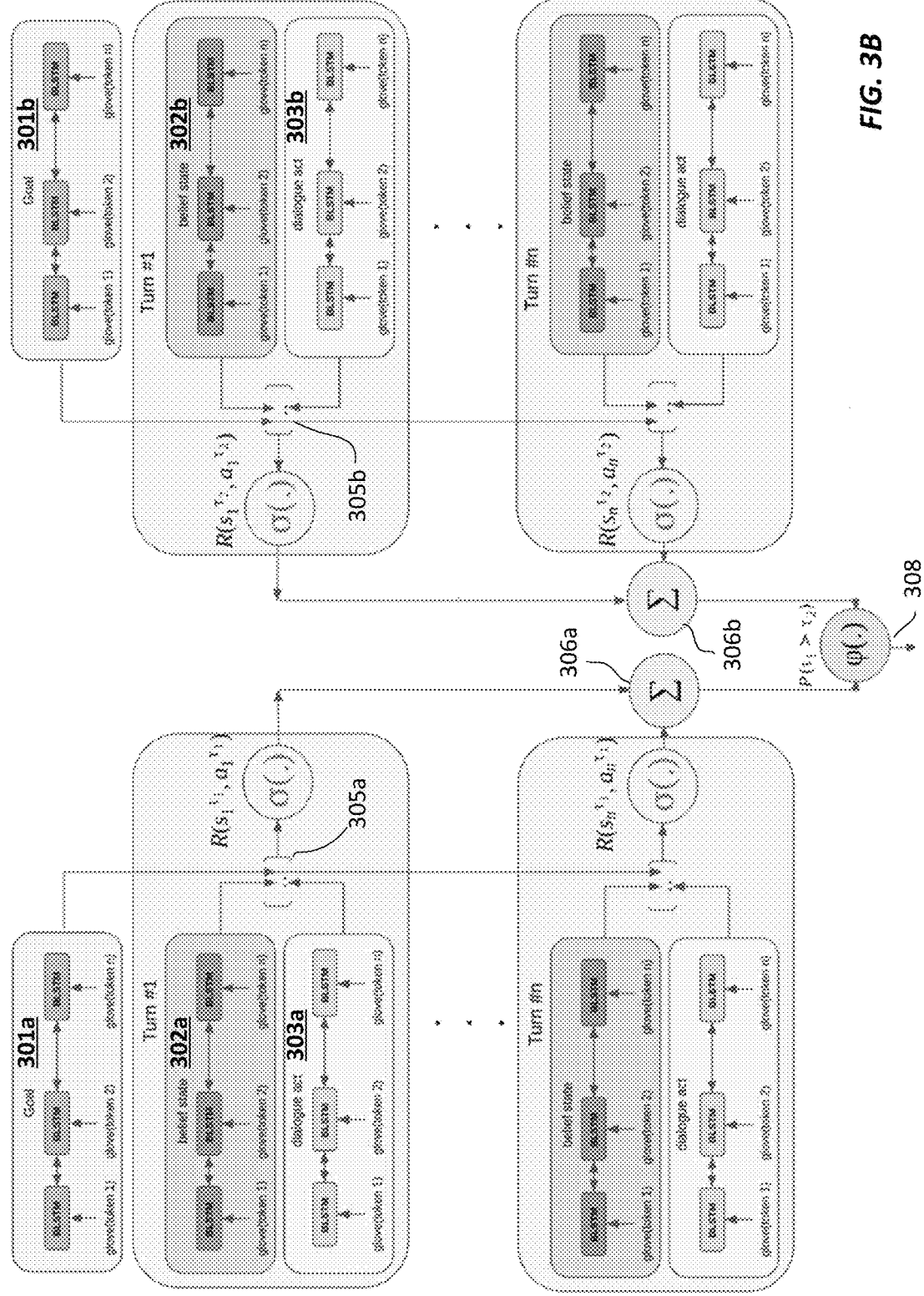
FIG. 3B provides a simplified diagram illustrating a network architecture for the reward learning module shown in FIG. 2, according to one embodiment described herein.

As further described in relation to FIG. 3B, $R(\tau) = \Sigma_{t=0}^T R(s_t, a_t|(s_t, a_t) \in \tau)$ is defined as the preferential probability represented by:

$$P[\tau^1 \succ \tau^2] = \frac{\phi(R(\tau^1))}{\phi(R(\tau^1)) + \phi(R(\tau^2))}$$

Here $\phi(\ )$ could either be exp( ) or identity 1( ) For example, the probability may be computed using hyper parameters:

$$P[\tau^1 \succ \tau^2] = \frac{\exp(\Sigma_{t=1}^T r(o_t^1, a_t^1, g^1))}{\exp(\Sigma_{t=1}^T r(o_t^1, a_t^1, g^1)) + \exp(\Sigma_{t=1}^T r(o_t^2, a_t^2, g^2))}$$

Thus, reward R may be optimized by minimizing a binary cross-entropy loss between the preference probability $P[\tau^1 \succ \tau^2]$ and the normalized metrics score $\mu(\tau)$ between a pair of rollouts. For example, the normalized metric score is computed based on a first metric score of a first dialogue $\tau^1$ from the pair and a second metric score of a second dialogue $\tau^2$ from the pair, and both the first metric score and the second metric score are generated by the same score function M ( ) e.g., $$\mu(\tau^1) = \frac{M(\tau^1)}{M(\tau^1) + M(\tau^2)}.$$

In this way, the network (with the reward) is trained to generate dialogues with performance metrics that can closely reflect the preference between a rollout pair. The loss objective for pairwise reward learning can be computed by:

$$L(\theta_1, \theta_2) = \min - \mathbb{E}_{\tau^1, \tau^2 \sim \Pi}[\mu(\tau^1)\log P[\tau^1 \succ \tau^2] + \mu(\tau^2)\log P[\tau^2 \succ \tau^1]] \quad (4)$$

where, $$\mu(\tau^1) = \frac{M(\tau^1)}{M(\tau^1) + M(\tau^2)} \quad (5)$$

Here $\theta_1$ and $\theta_2$ correspond to the parameters for reward R(a, s, g; $\theta_1$) and discount factor $\gamma(\theta_2)$, respectively. Specifically, the discount factor $\gamma$ may be pre-defined, or learnt during training.

Thus, the reward learning module 260 receives and splits the dataset D into K-fold training and validation subsets 261. For example, the dataset 210 is partitioned into complementary subsets 261, performing training on one subset, and validating the trained network on another (test) subset. At every epoch of training, K-baseline models 261a-n are trained based on cross entropy loss (instead of (3)) using the K training subsets. The trained K-baseline models 261a-n are used to predict on the corresponding validation subsets, and each baseline model may be similar to the neural model used by the policy network 220. The predicted action distribution from the K-baseline models are used to generate output dialogues 264a-n, each of which is scored by a chosen metric 263. Thus, a pair of dialogues from the predicted dialogues 264a-n with corresponding score functions may be used to compute the pairwise reward loss (4) at the pairwise causal reward learning module 265. The pairwise reward loss (4) may then be used to backpropagate a neural network to update the parameters $\theta_1/\theta_2$. In this way, the pairwise causal reward learning module 265 outputs the reward function reward R(a, s, g; $\theta_1$) and discount factor $\gamma(\theta_2)$. For example, the neural network for the pairwise causal reward learning module 265 may be a one bi-LSTM layer that embeds action, state and goal, followed by a couple of multilayer perceptron (MLP) layers.

In another embodiment, let $\theta=(\theta_1, \theta_2)$, then the parameter $\theta$ can be updated by:

$$\theta := \theta - R_{capsi}(s,a)\nabla\pi_{blackbox}(a|s;\theta) \quad (6)$$

The learnt reward is akin to sample weights for each instance of the data, which helps to redistribute the gradient update budget among the samples based of their contribution to the overall success of the Task oriented Dialogue (ToD) system. To this end, learnt reward may be used as a sample weight to any existing ToD dialogue system to reap the benefit of sample efficiency it brings.

In one embodiment, the dialogue roll-outs are generated by expert latent policy. The data (dialogue rollouts) may be distributed as per the optimal latent policy and transition probability. The process of learning a policy that maximizes the likelihood of the data may be a curriculum for exploring the state action for the pairwise reward learning objective (5). The process of fitting a maximum likelihood (MLE) policy may induce useful perturbation by the stochasticity of an optimizer. After the output dialogues 264a-n are scored by a chosen metric 263, on the convergence of the MLE process, the pairs of learnt roll-outs with the corresponding metric scores may be used to train the preferential optimization (5), which in turn learns the fine grained reward R(a, s, g; $\theta_1$).

FIG. 3B provides a simplified diagram illustrating a network architecture 300 for the reward learning module 260 shown in FIG. 2, according to one embodiment described herein. In one embodiment, three single bi-LSTM layers, each is used to encode the goal, belief state and dialogue act or response sequences at each dialogue turn on each of the sampled roll-outs pairs. For example, the bi-LSTM layer 301a is used to encode the goal of the sampled predicted rollout $\tau_1$; the bi-LSTM layer 302a is used to encode the belief state of each dialogue turn of rollout $\tau_1$; and the bi-LSTM layer 303a is used to encode the dialogue act of each dialogue turn of rollout $\tau_1$. Similarly, the bi-LSTM layer 301b is used to encode the goal of the sampled predicted rollout $\tau_2$; the bi-LSTM layer 302b is used to encode the belief state of each dialogue turn of rollout $\tau_2$; and the bi-LSTM layer 303b is used to encode the dialogue act of each dialogue turn of rollout $\tau_2$.

In one embodiment, the three bi-LSTM layers can be used to encode both the rollout $\tau_1$ and $\tau_2$. In another embodiment, two sets of parallel bi-LSTM layers 301a, 302a, and 303a, and 301b, 302b and 303b may be used to encode the pair of sampled rollouts, respectively in parallel.

The three encoded representations from bi-LSTM layers 301a, 302a, and 303a are concatenated, at 305a. Or the three encoded representations from bi-LSTM layers 301b, 302b, and 303b are concatenated, at 305b.

The concatenated representation is then fed through couple of feed-forward layers before making a bounded reward prediction $R(s_1^{\tau_1}, a_1^{\tau_1}) \ldots R(s_n^{\tau_1}, a_n^{\tau_1})$ or $R(s_1^{\tau_2}, a_1^{\tau_2}) \ldots R(s_n^{\tau_2}, a_n^{\tau_2})$ for each turn of the rollout $\tau_1$ or $\tau_2$ using a sigmoid function. The per turn rewards are summed, e.g., at over all turns of each rollout to form a global reward $R(\tau_1)$ or $R(\tau_2)$ for the pair of rollouts.

Using a pair of dialogue rewards $R(\tau_1)$ and $R(\tau_2)$, the probabilistic preference between the rollouts can be computed either by standard normalization or a softmax function, e.g., $$P[\tau^1 \succ \tau^2] = \frac{\phi(R(\tau^1))}{\phi(R(\tau^1)) + \phi(R(\tau^2))}$$

where the $\phi(\ )$ function may be standard normalization or a softmax function. The output 307 of this preference probability may be optimized using a cross entropy loss described in Eqn. (4).

Figure 4:
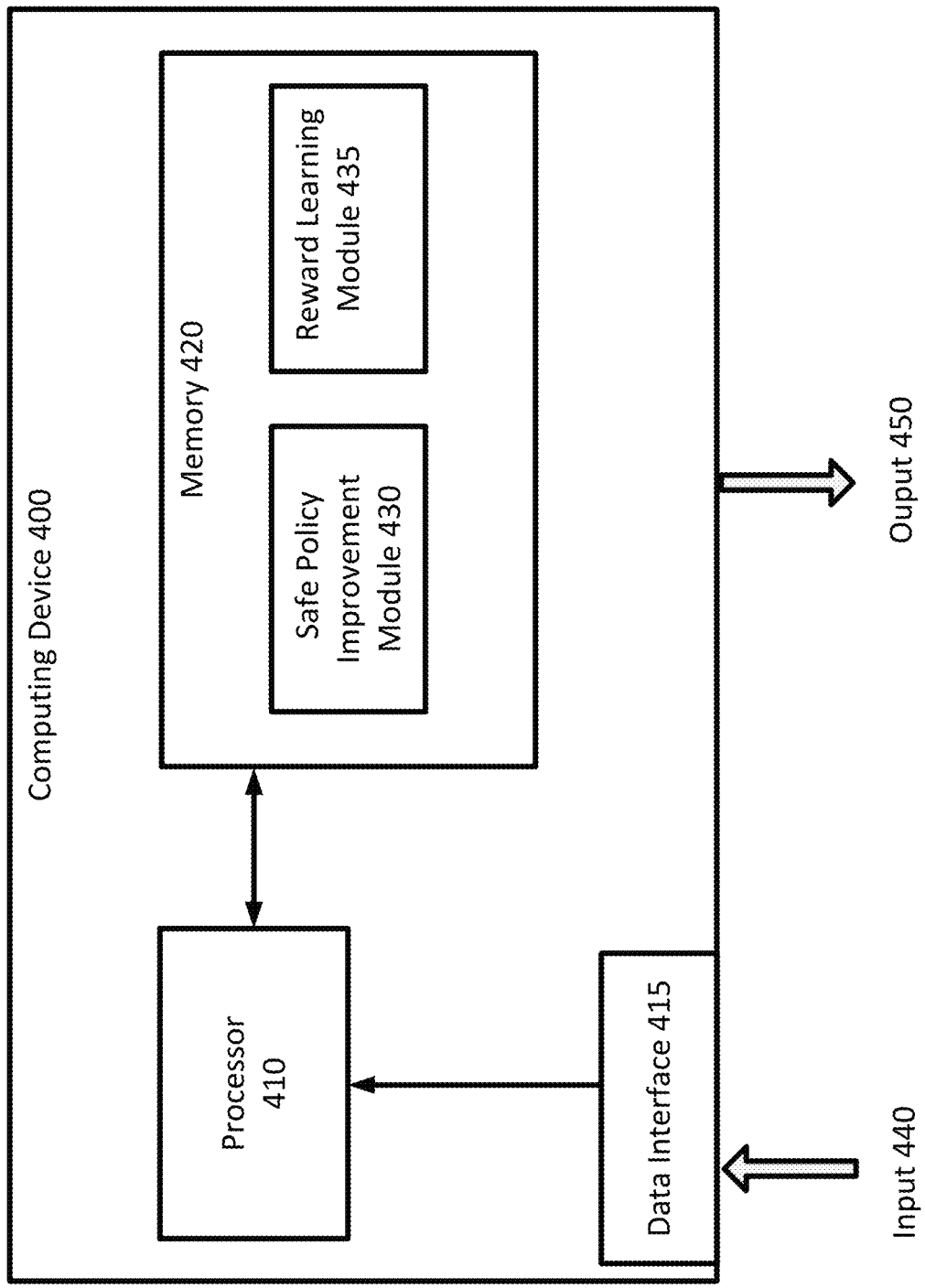
FIG. 4 is a simplified diagram of a computing device for implementing the safe policy improvement and reward learning for task-oriented dialogue, according to some embodiments.

FIG. 4 is a simplified diagram of a computing device for implementing the safe policy improvement and reward learning for task-oriented dialogue, according to some embodiments. As shown in FIG. 4, computing device 400 includes a processor 410 coupled to memory 420. Operation of computing device 400 is controlled by processor 410. And although computing device 400 is shown with only one processor 410, it is understood that processor 410 may be representative of one or more central processing units, multi-core processors, microprocessors, microcontrollers, digital signal processors, field programmable gate arrays (FPGAs), application specific integrated circuits (ASICs), graphics processing units (GPUs) and/or the like in computing device 400. Computing device 400 may be implemented as a stand-alone subsystem, as a board added to a computing device, and/or as a virtual machine.

Memory 420 may be used to store software executed by computing device 400 and/or one or more data structures used during operation of computing device 400. Memory 420 may include one or more types of machine readable media. Some common forms of machine readable media may include floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Processor 410 and/or memory 420 may be arranged in any suitable physical arrangement. In some embodiments, processor 410 and/or memory 420 may be implemented on a same board, in a same package (e.g., system-in-package), on a same chip (e.g., system-on-chip), and/or the like. In some embodiments, processor 410 and/or memory 420 may include distributed, virtualized, and/or containerized computing resources. Consistent with such embodiments, processor 410 and/or memory 420 may be located in one or more data centers and/or cloud computing facilities.

In some examples, memory 420 may include non-transitory, tangible, machine readable media that includes executable code that when run by one or more processors (e.g., processor 410) may cause the one or more processors to perform the methods described in further detail herein. For example, as shown, memory 420 includes instructions for a safe policy improvement module 430 and a reward learning module 435 that may be used to implement and/or emulate the systems and models, and/or to implement any of the methods described further herein. In some examples, the safe policy improvement module 430 and the reward learning module 435 receives an input 440 via a data interface 415 and may generate an output 450.

For example, the input 440 may include a training dataset 210 as shown in FIGS. 2-3. The data interface 215 may include a communication interface that receives the dataset input 440 from a remote database via a communication network. In another example, the data interface 215 may include a user interface via which a user may select and load the dataset input 440 to the processor 410. The output 450 may include an action distribution for a dialogue, an optimized policy, and/or the like.

The safe policy improvement module 430 may comprise a policy network 220, a stochastic loss module 230, a deterministic loss module 240, and a combined loss module 250 shown in FIG. 2. The reward learning module 435 may be similar to module 260 shown in FIG. 2, which is further detailed in FIG. 3. The reward learning module 435, as described in relation to FIG. 3, may comprise K-base models 262a-n and a pairwise causal reward learning module 265.

FIGS. 5A-5B provide an example logic flow diagram illustrating a method 500 of MDP-based safe policy improvement, accordingly to an embodiment. One or more of the processes 502-524 of method 500 may be implemented, at least in part, in the form of executable code stored on non-transitory, tangible, machine-readable media that when run by one or more processors may cause the one or more processors to perform one or more of the processes 502-524. In some embodiments, method 500 may correspond to the method used by the module 430.

At process 502, A training dataset (e.g., dataset 210) comprising a plurality of dialogue rollouts (e.g., rollouts 212a-n) generated by a latent stochastic behavior policy is received. Each rollout includes a time series of observations representing information of a respective dialogue at a plurality of dialogue turns.

At process 504, only belief states (e.g., $\{b_t\}$) from the observations of the training dataset is input to a neural model (e.g., policy network 220) in a first pass to the neural model.

At process 506, a first predicted action distribution is generated based on a current state of the respective dialogue according to a target policy, e.g., $\tau_e(s_t; \theta)$.

At process 508, a first discounted sum of future reward based on a discount parameter and a reward function of actions and states of the respective dialogue according to the latent behavior policy. Specifically, during the first pass, an action distribution is conditioned on a belief state according to the latent stochastic behavior policy, and the belief state is obtained from the time series of observations.

At process 510, a first loss objective is computed based on a first expectation of the first discounted sum of future reward and the first predicted action distribution. Specifically, the first expectation is taken over a probability distribution of the states and the actions according to the latent stochastic behavior policy, e.g., according to (1).

At process 512, the full observations are input to the neural model in a second pass. For example, in addition to the belief states, all the observation information $\{o_t = (b_t, u_t^u, u_{t-1}^a)\}$ from the dataset 210 is input to the policy network 220.

At process 514, a second predicted action distribution is generated based on a current observation from the time series of observations according to the target policy. For example, the action distribution $\tau_e(o_t)$ is generated.

At process 516, a second discounted sum of future reward based on the discount parameter and the reward function for a specific rollout is computed, e.g., $G(\tau^i, t) = \Sigma_{t'=t}^{T} \gamma_{\theta_1}^{t'-t} R_{\theta_2}(g^i, s_{t'-t}, a_{t'})$. Specifically, the second discounted sum of future reward is a collapsed near-deterministic approximation of the first discounted sum of future reward.

At process 520, a second loss objective is computed based on a second expectation of the second discounted sum of future reward and the second predicted action distribution. Specifically, the second expectation is taken over an average of the observations across the training dataset. For example, the second loss objective is computed by the deterministic loss module 240 according to (2).

At process 522, a combined loss objective is compute by summing the first loss objective and the second loss objective, e.g., according to (3).

At process 524, the neural model is updated based on the combined loss objective, subject to a condition that a KL-divergence between the latent stochastic behavior policy and the target policy conditioned on the current state of the respective dialogue is less than a pre-defined hyperparameter.

FIG. 6A provides an example pseudo-code segment illustrating an algorithm for causal aware safe policy improvement (CASPI), according to an embodiment described herein. The (train) dataset is subsampled into K-fold training $D_T$ and validation sets $D_V$. K-baseline models are trained to fit the data distribution generated by experts using cross entropy loss. During the process of fitting the data distribution, the still learning K-policies are used to predict on their corresponding K-fold validation subsets at every epoch of the training. Each of the dialogue is scored by the chosen dialogue level metric during the training. On convergence of the supervised learning process, pairs of dialogue predictions generated by the above process, along with their corresponding metric score are used to train for preferential optimization objective Eqn. (4), which in-turn learns fine grained reward R(a; s; g; θ). The use of K-fold subsampling and K-baseline models helps generate stochaticity in the samples generated. It also helps in effectively using the data and make the method sample efficient.

Figure 6B:
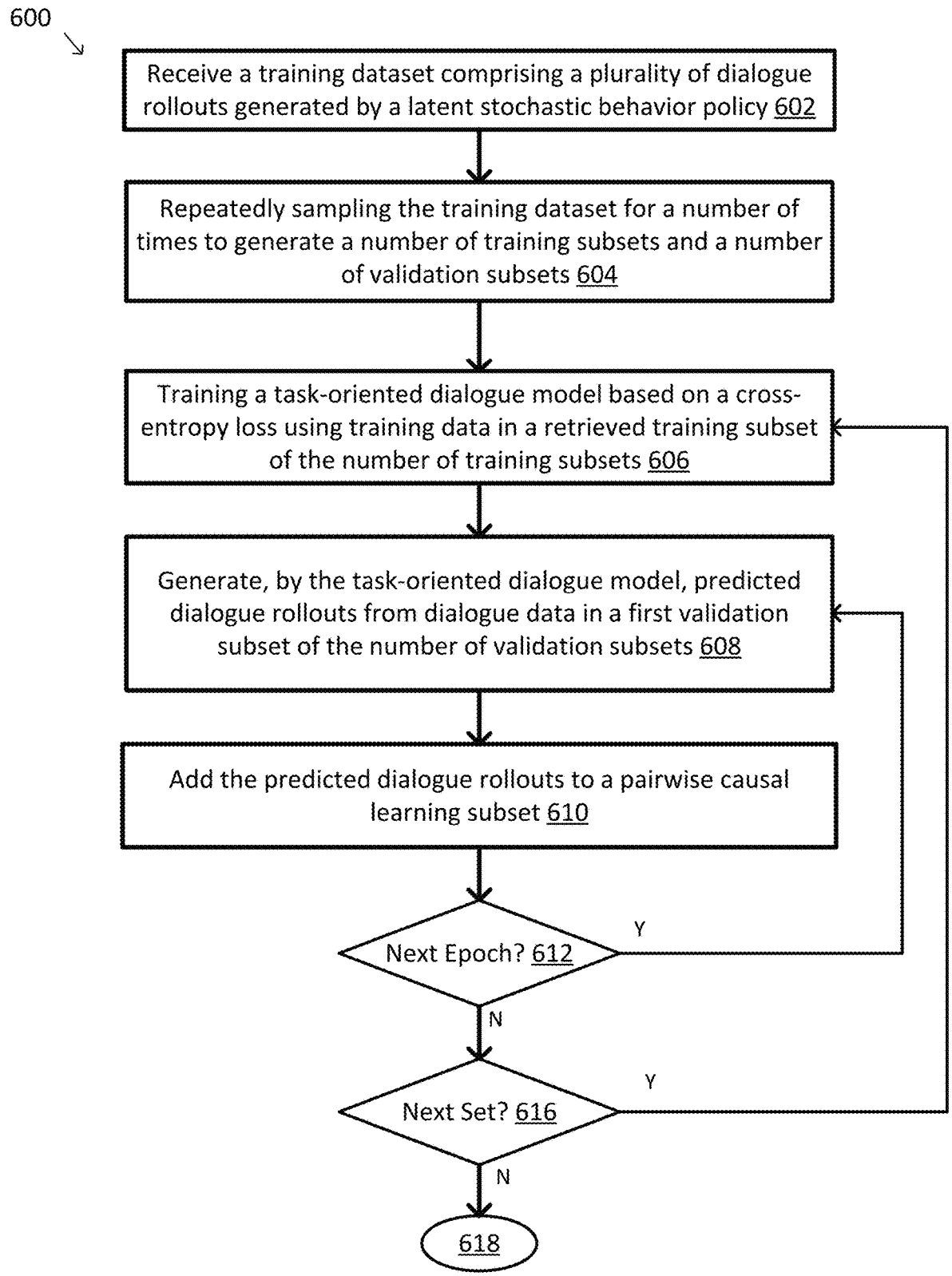
FIGS. 6B-6C provide an example logic flow diagram illustrating a method for the CASPI algorithm shown in FIG. 6A, according to an embodiment described herein.
Figure 6C:
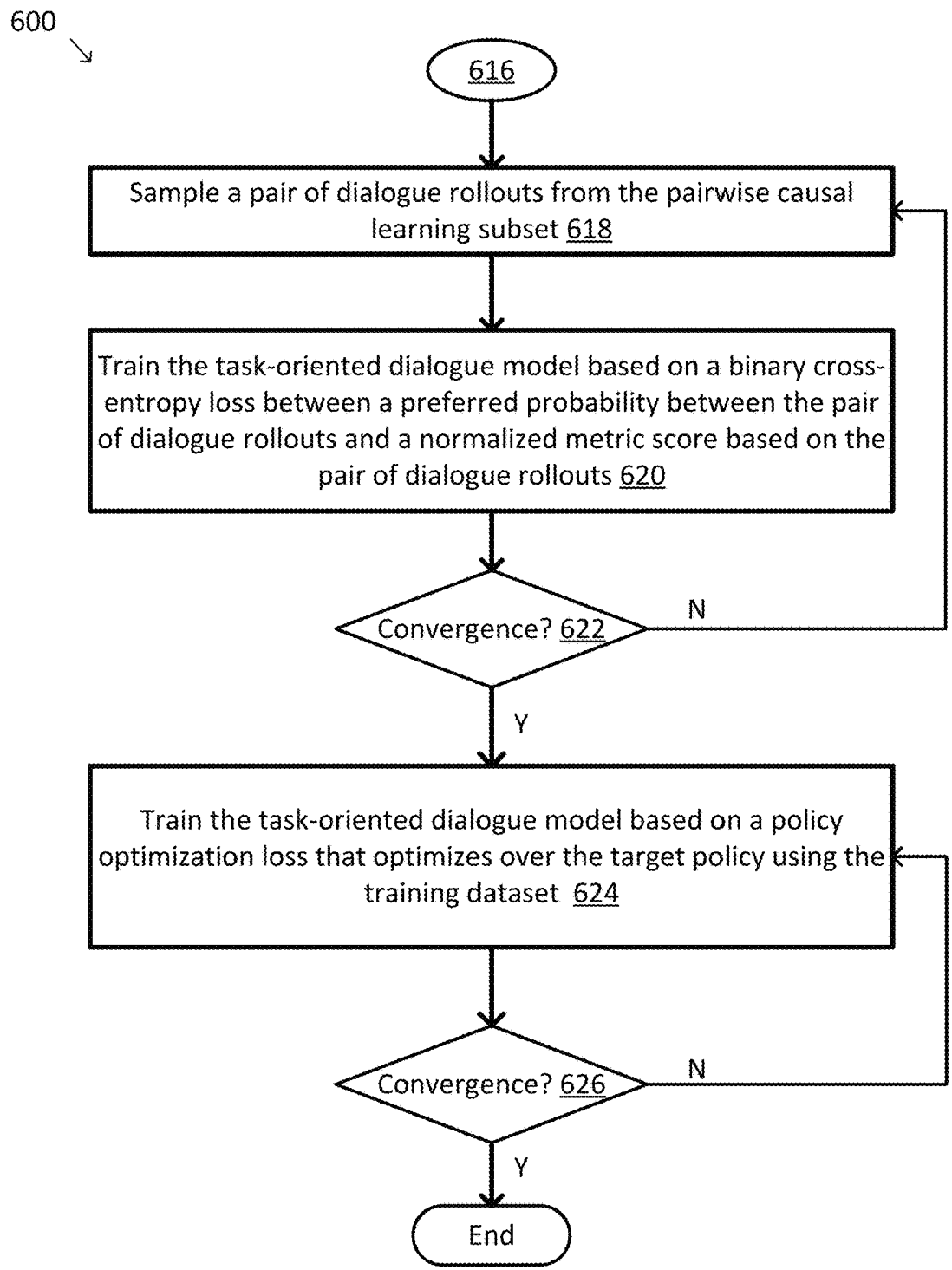

FIGS. 6B-6C provide an example logic flow diagram illustrating a method for the CASPI algorithm shown in FIG. 6A, according to an embodiment described herein. One or more of the processes 602-626 of method 600 may be implemented, at least in part, in the form of executable code stored on non-transitory, tangible, machine-readable media that when run by one or more processors may cause the one or more processors to perform one or more of the processes 602-626. In some embodiments, method 500 may correspond to the method used by the module 430.

At process 602, A training dataset (e.g., dataset 210) comprising a plurality of dialogue rollouts (e.g., rollouts 212a-n) generated by a latent stochastic behavior policy is received.

At process 604, the training dataset is repeatedly sampled for a number of times to generate a number of training subsets and a number of validation subsets. For example, as escribed in relation to FIG. 3A, the dataset D is split into K-fold training $D_T$ and validation subsets $D_V$ 261. For example, the dataset 210 is partitioned into complementary subsets 261, performing training on one subset, and validating the trained network on another (test) subset.

At process 606, for each dataset in ($D_T$, $D_V$), a task-oriented dialogue model is trained based on a cross-entropy loss using training data in a first training subset of the number of training subsets. For example, a dataset is retrieved from the number of training subsets or the number of validation subsets ($D_T$, Dv), and the task-oriented dialogue model is updated by minimizing an entropy of a predicted dialogue action conditioned on a current state of a dialogue according to a target policy using dialogue data from the retrieved dataset. The entropy loss can be expressed as:

$$-\min \mathbb{E}_{a,s \sim D_T} \log(\pi_m(\hat{a}|s))$$

where $\pi_m(s)$ denotes predicted dialogue action $\hat{a}$ according to the policy $\pi_m$ conditioned on the dialogue states s.

At step 608, for the same respective dataset from step 606, the task-oriented dialogue model generates predicted dialogue rollouts from dialogue data in a first validation subset of the number of validation subsets.

At step 610, the predicted dialogue rollouts are added to a pairwise causal learning subset $D_P$. From step 612, steps 608-610 may be repeated if there is another training epoch. If there is no other training epoch at step 612, method 600 may determine whether there is another dataset in ($D_T$, $D_V$) at step 616. If there is another dataset, method 600 proceeds to repeat from step 606 with another dataset. If there is no other dataset, method 600 proceeds to step 618.

At step 618, a pair of dialogue rollouts may be sampled from the pairwise causal learning subset.

At step 620, the task-oriented dialogue model may be trained based on a binary cross-entropy loss between a preferred probability between the pair of dialogue rollouts and a normalized metric score based on the pair of dialogue rollouts. For example, step 620 may be illustrated by the process flow described in relation to FIG. 3B.

At step 622, method 600 determined whether training convergence has been reaching using data $D_P$. If not, method 600 repeats from step 618 with re-sampling another pair of sampled pair of dialogue rollouts. If convergence has been reached using data $D_P$, method 600 proceeds to step 624.

At step 624, the task-oriented dialogue model may be trained based on a policy optimization loss that optimizes over the target policy using the training dataset. For example, the optimization over policy is discussed in relation to method 500 in FIGS. 5A-5B.

At step 626, method 600 determined whether training convergence has been reaching using data D. If not, method 600 repeats from step 624. If convergence has been reached using data D, method 600 may end.

Figure 7:
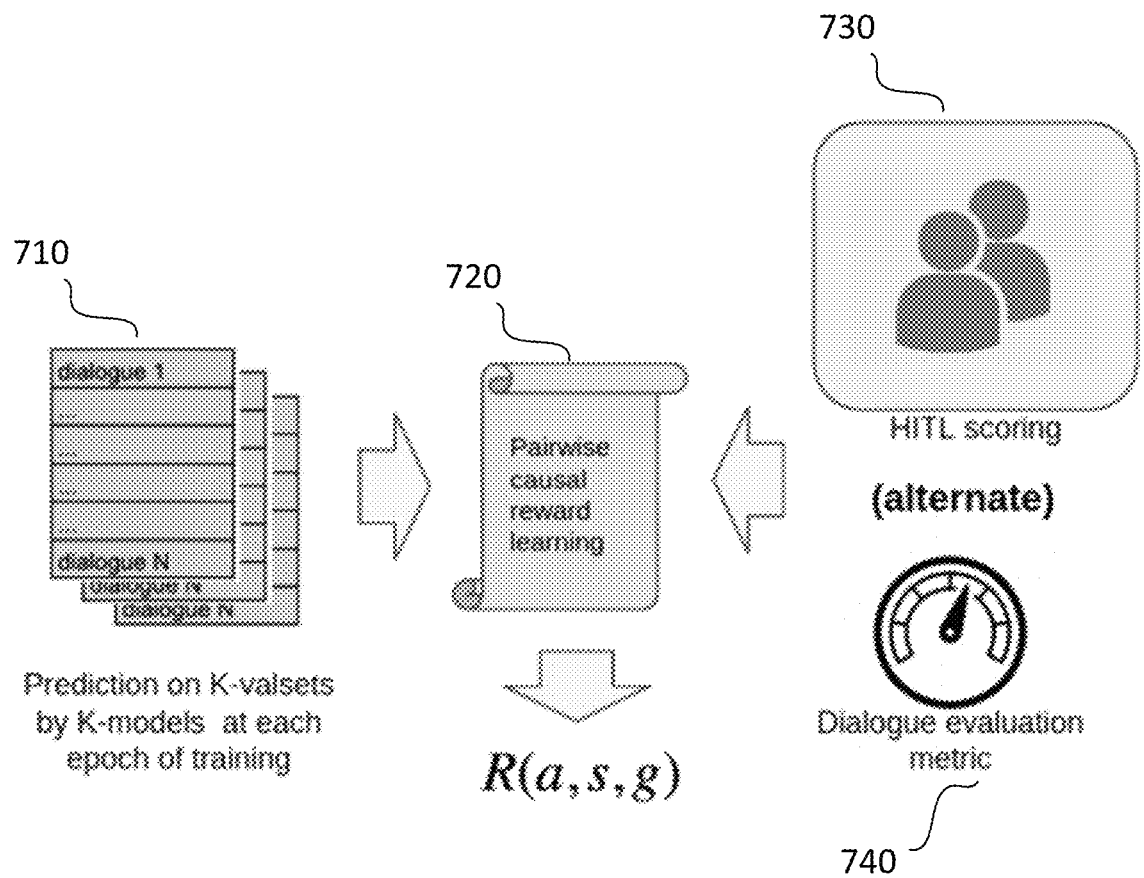
FIG. 7 is a simplified block diagram illustrating a mixed human-in-the-loop and automatic evaluation metric scores for pairwise reward learning, according to embodiments described herein.

FIG. 7 is a simplified block diagram illustrating a mixed human-in-the-loop and automatic evaluation metric scores for pairwise reward learning, according to embodiments described herein. Automatic evaluation metrics have their own biases. True objective of ToD is human experience while interacting with the dialogue systems, which automatic evaluation metrics might fall short to capture. To this end human evaluation may be conducted on the quality of the generated response. Quality can be defined by the following criteria: (a) Appropriateness, e.g., are the generated responses appropriate for the given context in the dialogue turn? (b) Fluency, e.g., are the generated responses coherent and com-prehensible?

Therefore, as shown in FIG. 7, after prediction on the K validation sets by K models at each epoch of training at 710, and the pairwise causal reward learning at 702, a dialogue turn in the test set is randomly picked. The human evaluators were shown context leading up to the turn and gave an evaluation score at 730 of the dialogue turn. The predictions for the turn by different models were anonymized and displayed to the evaluators. For example, the human evaluators were asked to give a score between 1 and 5 for appropriateness and fluency, with score of 5 being best and 1 being the worst. 100 randomly selected dialogue turns were presented to 10 participants.

The ToD model is then trained for reward R(s, a, g) using pairwise causal reward learning as described in relation to FIGS. 6A-6C, where examples of the mini batch are randomly sampled either from human scored examples 730 or the ones scored by the automatic evaluation metric 740.

It is noted that embodiments described throughout FIGS. 1A-7 relate to dialogue policy learning. However, similar embodiments can be applied to different tasks in similar settings, such as but no limited to end-to-end dialogue system training (e.g., dialogue state tracker, dialogue policy and response generation, etc.), and/or the like.

Example Performance

In one embodiment, the training dataset (e.g., 210) can be the MultiWoz2.0 dataset, a multi-turn multi-domain dataset spanning seven domains, including attraction, hos-pital, hotel, police, taxi, train and an additional domain for general greeting. The dataset is created from real human conversation, between a tourist and a clerk at an information center. Each dialogue is generated by users with a defined goal which may cover 1-5 domains with a maximum of 13 turns in a conversation. The dataset has 10438 dialogues split into 8438 dialogues for training set and 1000 dialogues each for validation and test set.

In one embodiment, the policy network 220 and/or the reward learning network 260 may adopt a neural model proposed in Zhang et al., Task-oriented dialog systems that consider multiple appropriate responses under the same context, arXiv preprint arXiv:1911.10484, 2019 as the baseline (referred to as "DAMD"). For the pairwise casual reward learning network 260, a one bi-LSTM layer to embed action, state and goal, followed by couple of MLP layers may be used. DAMD is composed of three seq2seq generative model using GRUs. The three seq2seq models are one each for belief state, dialogue act and response generation modules. An attention layer is then used to attend the outputs of the seq2seq models with the context vector of previous turn for copy over mechanism. The outputs are then used as representation for predicting series of tokens for their respective modules. Both stochastic, $L_{sto}$ and deterministic, $L_{det}$ loss functions are used on dialogue act. For DST and response generation, the cross entropy loss is used as is from DAMD.

In one embodiment, the reward learning network 260 includes another model with more complexity includes the Task Oriented Dialogue model, MinTL described in Lin et al., Mintl: Minimalist transfer learning for task-oriented dialogue systems, arXiv preprint arXiv:2009.12005, 2020. MinTL uses a large pretrained language model BART that use as a standard encoder decoder transformer architecture with a bidirectional encoder and an autoregressive decoder. It is pre-trained on the task of denoising corrupt documents. BART is trained using cross-entropy loss between the decoder output and the original document. MinTL doesn't explicitly predict dialogue act. Hence the deterministic loss, $L_{det}$ is used directly on the generated response and for DST we retain the loss as is from MintTL.

In one embodiment, database results are represented as one-hot vectors. To reduce surface-level variability in the responses, domain-adaptive delexicalization preprocessing is adopted, and delexicalized responses are generated with placeholders for specific values which can be filled according to the current utterance that refers to some slot values offered by the system in the previous turn.

In one embodiment, context-to-response generation task of Multi-woz2.0 may be implemented and the corresponding evaluation metrics are used to measure the quality of the response. These include inform rate and success rate which measures the fraction of dialogue, the system has provided requested information and the fraction of the dialogues the system has answered all the requested information respectively, and BLEU is used to measure the fluency of the generated response. Both of these setting uses three evaluations metrics. These include: 1) inform rate—measures the fraction of dialogue, the system has provided the correct entity, 2) success rate—fraction of dialogues, the system has answered all the requested information and 3) BLEU—measures the fluency of the generated response. The combined score (Inform+Success)×0:5+BLEU is also used. All the numbers of CASPI reported are median of 5 runs with different seeds.

For the metric M used in pairwise causal reward learning, the following metric is used:

$$M:=\text{Inform}+\text{Success}+\lambda \times \text{BLEU}$$

This is very similar to combined score used in evaluation and both are equivalent when $\lambda=2$. Hyperparamter $\lambda$ is used to normalize the achievable scale of BLEU. The success rate, if used as is, will result in non-markovian and stochastic per turn reward function, since the reward of current state will depend on the performance of future states. Hence, a soft version of the metric $M_{soft}$ is used, where the success rate measures a fraction of requested information provided in a dialogue. The original metric that uses the discrete variant of success rate is referred to as $M_{hard}$. The choice of action in reward function $R(s_t, a_t, g)$ can either be dialogue act or generate response, we refer corresponding variants of metrics as M(act) and M(resp). To demonstrate the versatility of the method to adapt to different metrics, all the discussed variants of the metric are used.

The causal aware safe policy improvement (CASPI) is compared against existing methods on context-to-response generation task of Multiwoz2.0 in FIG. 8. The existing methods include:

DAMD: Introduced by Zhang et al. is a domain-aware multi-decoder network. The method also exploits stochastic nature of the dialogue act by using a data-augmentation technique called the multi-action data augmentation. DAMD with data augmentation is denoted here as DAMD+multi-action.

HDSA by (Chen et al., Semantically conditioned dialog response generation via hierarchical disentangled self-attention. (HDSA), arXiv preprint arXiv:1905.12866, 2019) proposes to use hierarchical graph representation for dialogue act. It uses a pre-trained 12-layer BERT model to represent dialogue act. The predicted dialogue act is transformed to the hierarchical graph structure using disentangled self-attention model, a 3-layer self-attention model.

SOLOIST (Peng et al., Soloist: Few-shot task-oriented dialog with a single pre-trained auto-regressive model, arXiv preprint arXiv:2005.05298, 2020). These method are trained on turn-level data without generated belief state and system act in dialog history.

MinTL-BART (Lin et al.), introduced Levenshtein belief spans framework that predicts only the incremental change in dialogue state per turn. It leverages the pretrained T5 and BART as backbone for model architecture.

HDNO proposed by (Wang et al., Modelling hierarchical structure between dialogue policy and natural language generator with option framework for task-oriented dialogue system. arXiv preprint arXiv:2006.06814, 2020) is a dialogue pol-icy learning method to solve context-to-response generation task of Multiwoz2.0 (Budzianowski et al., 2018b). It exploits the hierarchical nature of dialogue act and response generation task by proposing an option-based framework of Hierarchical RL and variational model to learn a latent dialogue act that corresponds to natural language response. Unlike CASPI, HDNO though highlights the risk of sparsity of metric function such as success rate as reward function, resorts to shaping a proxy reward function. Use markov language model as a proxy reward function. The language model is learnt independent of the metric function. CASPI refrains from reward shaping and is independent of the nature of any underspecified metric function.

CASPI is first compared against the current state of the art methods on the context-to-response generation task defined by MultiWoz2.0. The results are tabulated at FIG. 8. CASPI adaptation of DAMD, CASPI(DAMD) are used for this task. CASPI(DAMD) performs better than other methods on three of the four performance criteria i.e success rate, inform rate and combined score. HDSA has better BLEU score. This rich expressiveness of natural language by HDSA, stems from the use of large 12-layers BERT model.

Secondly, both adaptation of CASPI(DAMD) and CASPI (MinTL) are compared on the end-to-end dialogue tasks defined by MultiWoz2.0. The results are tabulated FIG. 9. CASPI(DAMD) with it's light weight model architecture with no pretraining on any external corpus, was able to outperform all other previous method in all evaluation criteria. This goes to show using CASPI to shepherd the gradient update process as sample weights for each dialogue turn leads to a model that's well aligned with true objective of the task. CASPI(MinTL) with its robust pretrained model out performs CASPI(DAMD) by a large margin. This goes to show the ease of adaptation of existing methods with CASPI.

Inverse reinforcement learning, coupled with off-policy policy learning and evaluation are proven to be sample efficient. CASPI is competitive with other sample efficiency techniques, such as data augmentation and transfer learning as performed by (Zhang et al.) and (Lin et al.) respectively. To demonstrate the hypothesis, CASPI is tested against baseline in a low sample complexity regime. For experimental setup, the low resource testing strategy from (Lin et al.). The CASPI model is trained on 5%, 10%, and 20% of the training data and compared with other baselines on end-to-end dialogue and context-to-response generation tasks, FIGS. 10-11 list the results. In end-to-end task, CASPI(MinTL) trained only on 10% of data was able to out perform previous state of the art method, MinTL trained on 100% data on two of the three performance metrics. On the context-to-response generation task, CASPI(DAMD) trained on 75% of the data was able to match 100% data performance of HDNO. This goes to show that having the right reward function to guide the budget of the gradient update process to reach the true objective is important in extremely low resource setting.

FIG. 12 shows an example of generated responses by different ToD models, such as MinTL, CASPI (MinTL), DAMD and Simple TOD.

Figure 13:
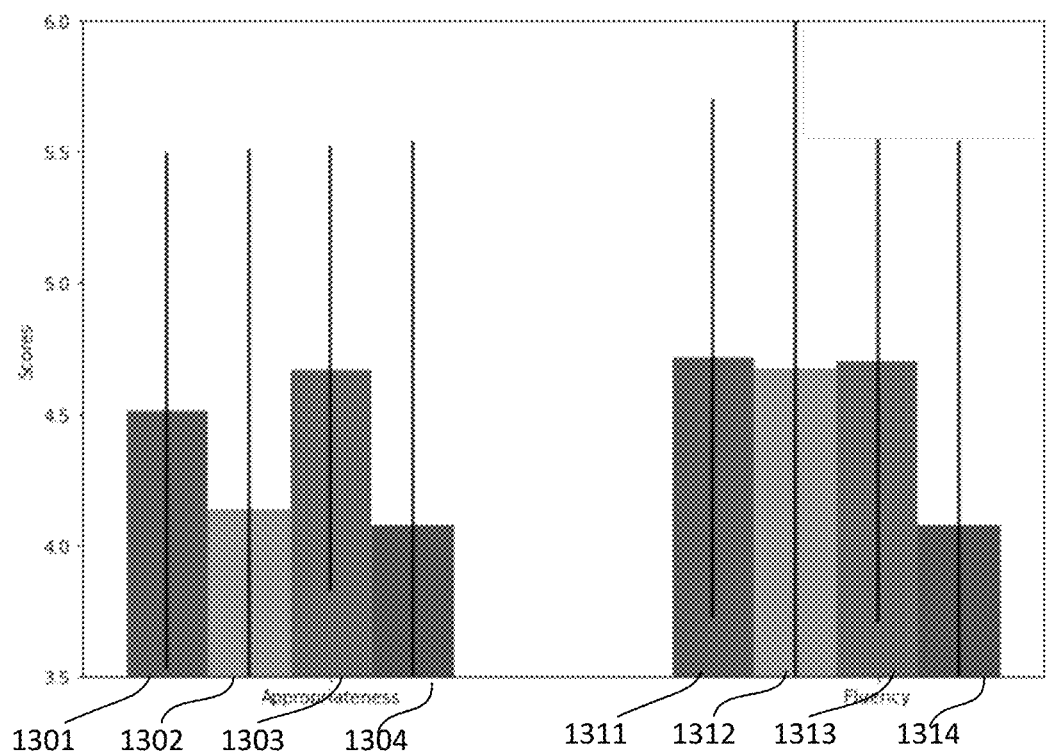

FIG. 13 shows the human evaluation on criteria appropriateness and fluency. The mean and variance of the score is shown. The Appropriateness scores of MinTL 1301, SimpleTOD 1302 and DAMD 1304 are compared against the CASPI (MinTL) appropriateness 1303. The fluency scores of MinTL 1311, SimpleTOD 1312 and DAMD 1314 are compared against the CASPI (MinTL) fluency 1313. The results of the evaluation. CASPI(MinTL) 1303 outperforms all other models 1301, 1302 and 1304 in appropriateness score. While fluency scores of CASPI(MinTL) 1313, MinTL 1311 and SimpleTOD 1312 are comparable to each other.

Figure 14:
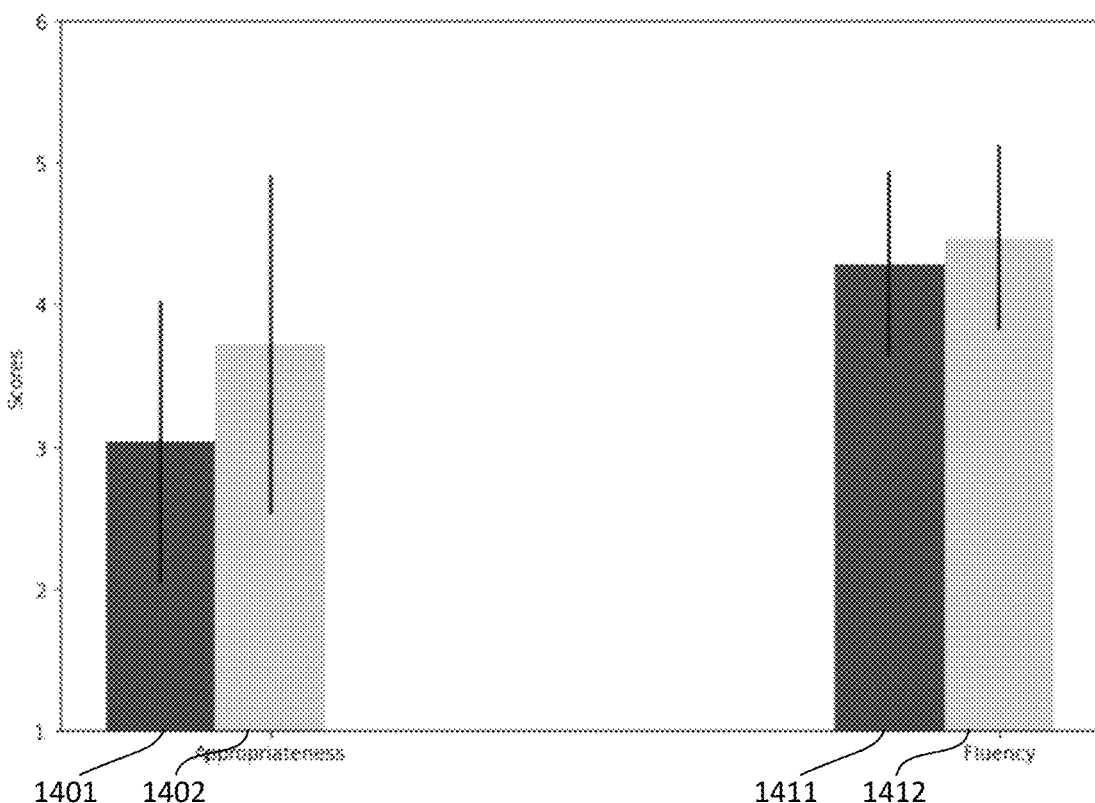

As automatic dialogue evaluation metrics are biased and doesn't truly reflect the human objective but in CASPI these very same dialogue evaluation metrics are used to learn reward R(s, a, g). To bridge this gap, the following human-in-the-loop (HITL) experiment is conducted: a pair CASPI (MINTL) models with different seeds are trained, on 5% of Multiwoz2.0 dataset. These pair of models are then used to predict on 0.5% of Mul-tiwoz2.0 train data (40 dialogues) and had a human score these pairs of generated response relative to each other. The model is then trained for reward R(s, a, g) using pairwise causal reward learning as described in relation to FIGS. 6A-6C, where examples of the mini batch are randomly sampled either from human scored examples or the ones scored by the automatic evaluation metric as show in FIG. 13. A fresh CASPI(MINTL) model is then trained on the original 5% of data and the learnt R(s, a, g). Human evaluation of the trained model is performed on 24 dialogues form the test using 3 participants. FIG. 14 shows the performance. With the HITL score in the reward learning, a boost in performance in both the human evaluation criteria: appropriateness and fluency. The 5% data CASPI(MINTL)'s human appropriateness score is increased from 1401 to 1402, now comparable to 100% data DAMD. Fluency score also increased from 1411 to 1412. This goes to show the versatility of the pairwise causal reward learning. With enough richness of the neural network used, the pairwise causal reward learning can generalize to un-known dialogue evaluation criteria.

FIG. 15 shows the same conversation between a tourist and information center agents that is shown in FIG. 1B, with example reward value $R(s_t, a_t, g)$, that pairwise causal reward learning has predicted against each turn. It is observed that Turn #3 has received the highest reward, retrospectively we realize that this is the turn the transaction happens which is crucial and risk averse turn in a dialogue, which is captured by the success rate of the automatic evaluation metric. Turn #2 gets the next best reward which captures crucial information need for transaction to happen in Turn #3. Turn #4 gets reward an order lower than Turn #3 & 2 because other than nicety, it doesn't contribute much to the success of the conversation. It should be noted that it is typical Turn #4 will appear in almost all conversation and in supervised learning, it'll be receiving the highest share of gradient. The learnt reward redistributes the gradient budget that is aligned to the success of the dialogue objective.

FIG. 16 shows different types of behavior CASPI agents sometime exhibit, especially when trained in low sample regime. Greedy agent: In certain domains, the agents has a tendency to book a service before it has gathered all the required information or before the user requested or agreed for booking a service. The first example in FIG. 16 demonstrate this behavior. Here the user has requested for a taxi, before enough information such as destination or time of departure are gathered, the agent books the taxi. This happens because there are gaps in automatic evaluation metrics. A low BLEU score and relatively high inform and success rate might indicate greedy agent behaviour. Other reasons for low BLEU score includes: lack of diversity in the responses or malformation of response.

Cautious agent: The agent tends to be cautious by providing long winded replies packed with more information than needed. Agent tend to do this so as not to run the risk of loosing rewards through information rate. This behavior is demonstrated in the second example in FIG. 16. These subtle behavior demonstrates gap in automatic evaluation metrics, which may be reduced by using Human in the loop evaluation as shown in FIG. 7.

Some examples of computing devices, such as computing device 100 may include non-transitory, tangible, machine readable media that include executable code that when run by one or more processors (e.g., processor 110) may cause the one or more processors to perform the processes of method 200. Some common forms of machine readable media that may include the processes of method 200 are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

This description and the accompanying drawings that illustrate inventive aspects, embodiments, implementations, or applications should not be taken as limiting. Various mechanical, compositional, structural, electrical, and operational changes may be made without departing from the spirit and scope of this description and the claims. In some instances, well-known circuits, structures, or techniques have not been shown or described in detail in order not to obscure the embodiments of this disclosure. Like numbers in two or more figures represent the same or similar elements.

In this description, specific details are set forth describing some embodiments consistent with the present disclosure. Numerous specific details are set forth in order to provide a thorough understanding of the embodiments. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

What is claimed is:

1. A method for causal-aware safety policy improvement in task-oriented learning, comprising:
   receiving a training dataset comprising a plurality of dialogues, wherein the plurality of dialogues includes a first dialogue rollout generated according to a latent stochastic behavior policy;
   repeatedly sampling the training dataset for a number of times to generate a number of training subsets and a number of validation subsets;
   training a task-oriented dialogue model based on a cross-entropy loss using training data in a first training subset of the number of training subsets;
   generating, by the task-oriented dialogue model, predicted dialogue rollouts based on dialogue data in a first validation subset of the number of validation subsets;
   adding the predicted dialogue rollouts to a pairwise causal learning subset;
   sampling a pair of dialogue rollouts from the pairwise causal learning subset; and
   training the task-oriented dialogue model based on a binary cross-entropy loss between a preferred probability between the pair of dialogue rollouts and a normalized metric score based on the pair of dialogue rollouts.

2. The method of claim 1, further comprising:
   retrieving a dataset from the number of training subsets or the number of validation subsets; and
   training the task-oriented dialogue model by minimizing a cross-entropy of a predicted dialogue action conditioned on a current state of a dialogue according to a target policy using dialogue data from the retrieved dataset.

3. The method of claim 2, wherein the predicted dialogue rollouts are repeatedly generated according to the target policy by iterating the number of validation subsets.

4. The method of claim 1, wherein the training the task-oriented dialogue model based on a binary cross-entropy loss is performed by repeatedly sampling different pairs of dialogue rollouts from the pairwise causal learning subset and re-training the task-oriented dialogue model based on the binary cross-entropy loss until a convergence is reached in training.

5. The method of claim 1, wherein the training the task-oriented dialogue model, based on a binary cross-entropy loss further comprises:
   encoding, via three bi-LSTM layers, respectively, a goal, a belief state and a dialogue act or response sequence at each dialogue turn of each of the sampled pair of dialogue rollouts into three encoded representations;
   concatenating the three encoded representations;
   feeding the concatenated encoded representations to one or more feed-forward layers that generates a reward prediction for each dialogue turn;
   summing generated reward predictions into a dialogue reward for each one of the sampled pair of dialogue rollouts;
   computing the preferred probability between the pair of dialogue rollouts based on dialogue rewards corresponding to the sampled pair of dialogue rollouts; and
   computing the binary cross-entropy loss between the preferred probability between the pair of dialogue rollouts and the normalized metric score based on the pair of dialogue rollouts.

6. The method of claim 5, wherein the preferred probability between the pair of dialogue rollouts is computed using normalization or a softmax function.

7. The method of claim 1, further comprising:
   repeatedly training the task-oriented dialogue model based on a policy optimization loss that optimizes over the target policy using the training dataset until a training convergence is reached.

8. The method of claim 7, wherein the policy optimization loss is computed by:
   generating, by the task-oriented dialogue model, a first predicted action distribution based on a current state of a dialogue according to a target policy;
   computing a first discounted sum of future reward based on a discount parameter and a reward function of actions and states of the dialogue according to the latent behavior policy;
   computing a first loss objective based on a first expectation of the first discounted sum of future reward and the first predicted action distribution, wherein the first expectation is taken over a probability distribution of the states and the actions according to the latent stochastic behavior policy;
   generating, by the task-oriented dialogue model, a second predicted action distribution based on a current observation from a time series of observations according to the target policy;
   computing a second discounted sum of future reward based on the discount parameter and the reward function for a specific rollout, wherein the second discounted sum of future reward is a collapsed near-deterministic approximation of the first discounted sum of future reward;
   computing a second loss objective based on a second expectation of the second discounted sum of future reward and the second predicted action distribution, wherein the second expectation is taken over an average of the observations across the training dataset; and
   computing a sum of the first loss objective and the second loss objective.

9. The method of claim 8, further comprising:
   computing a gradient update component based on a learnt reward from the reward function of actions and states of the dialogue and a gradient of the target policy of the actions conditioned on the states and parameters of the task-oriented dialogue model; and updating the parameters of the task-oriented dialogue model using the gradient update component.

10. The method of claim 1, further comprising:
randomly selecting a dialogue turn during validation of the trained task-oriented dialogue model; and
receiving a set of manually created evaluation scores of a prediction on the dialogue turn from a plurality of evaluators.

11. A system for causal-aware safety policy improvement in task-oriented learning, the system comprising:
a communication interface receiving a training dataset comprising a plurality of dialogues, wherein the plurality of dialogues includes a first dialogue rollout generated according to a latent stochastic behavior policy;
a memory storing a plurality of processor-executable instructions; and
a processor reading the plurality of processor-executable instructions from the memory to perform operations comprising:
repeatedly sampling the training dataset for a number of times to generate a number of training subsets and a number of validation subsets;
training a task-oriented dialogue model based on an entropy loss using training data in a first training subset of the number of training subsets;
generating, by the task-oriented dialogue model, predicted dialogue rollouts from dialogue data in a first validation subset of the number of validation subsets;
adding the predicted dialogue rollouts to a pairwise causal learning subset;
sampling a pair of dialogue rollouts from the pairwise causal learning subset; and
training the task-oriented dialogue model based on a binary cross-entropy loss between a preferred probability between the pair of dialogue rollouts and a normalized metric score based on the pair of dialogue rollouts.

12. The system of claim 11, wherein the operations further comprise:
retrieving a dataset from the number of training subsets or the number of validation subsets; and
training the task-oriented dialogue model by minimizing an entropy of a predicted dialogue action conditioned on a current state of a dialogue according to a target policy using dialogue data from the retrieved dataset.

13. The system of claim 12, wherein the predicted dialogue rollouts are repeatedly generated according to the target policy by iterating the number of validation subsets.

14. The system of claim 11, wherein the operation of training the task-oriented dialogue model based on a binary cross-entropy loss is performed by repeatedly sampling different pairs of dialogue rollouts from the pairwise causal learning subset and re-training the task-oriented dialogue model based on the binary cross-entropy loss until a convergence is reached in training.

15. The system of claim 11, wherein the operation of training the task-oriented dialogue model based on a binary cross-entropy loss further comprises:
encoding, via three bi-LSTM layers, respectively, a goal, a belief state and a dialogue act or response sequence at each dialogue turn of each of the sampled pair of dialogue rollouts into three encoded representations;
concatenating the three encoded representations;
feeding the concatenated encoded representations to one or more feed-forward layers that generates a reward prediction for each dialogue turn;
summing generated reward predictions into a dialogue reward for each one of the sampled pair of dialogue rollouts;
computing the preferred probability between the pair of dialogue rollouts based on dialogue rewards corresponding to the sampled pair of dialogue rollouts; and
computing the binary cross-entropy loss between the preferred probability between the pair of dialogue rollouts and the normalized metric score based on the pair of dialogue rollouts.

16. The system of claim 15, wherein the preferred probability between the pair of dialogue rollouts is computed using normalization or a softmax function.

17. The system of claim 11, wherein the operations further comprise:
generating, by the task-oriented dialogue model, a first predicted action distribution based on a current state of a dialogue according to a target policy;
computing a first discounted sum of future reward based on a discount parameter and a reward function of actions and states of the dialogue according to the latent behavior policy;
computing a first loss objective based on a first expectation of the first discounted sum of future reward and the first predicted action distribution, wherein the first expectation is taken over a probability distribution of the states and the actions according to the latent stochastic behavior policy;
generating, by the task-oriented dialogue model, a second predicted action distribution based on a current observation from a time series of observations according to the target policy;
computing a second discounted sum of future reward based on the discount parameter and the reward function for a specific rollout, wherein the second discounted sum of future reward is a collapsed near-deterministic approximation of the first discounted sum of future reward;
computing a second loss objective based on a second expectation of the second discounted sum of future reward and the second predicted action distribution, wherein the second expectation is taken over an average of the observations across the training dataset; and
computing a sum of the first loss objective and the second loss objective.

18. The system of claim 17, wherein the operations further comprise:
computing a gradient update component based on a learnt reward from the reward function of actions and states of the dialogue and a gradient of the target policy of the actions conditioned on the states and parameters of the task-oriented dialogue model; and
updating the parameters of the task-oriented dialogue model using the gradient update component.

19. The system of claim 11, wherein the operations further comprise:
randomly selecting a dialogue turn during validation of the trained task-oriented dialogue model; and
receiving a set of manually created evaluation scores of a prediction on the dialogue turn from a plurality of evaluators.

20. A non-transitory processor-readable storage medium storing a plurality of processor-executable instructions for causal-aware safety policy improvement in task-oriented learning, the instructions being executed by a processor to perform operations comprising:
    receiving a training dataset comprising a plurality of dialogues, wherein the plurality of dialogues includes a first dialogue rollout generated according to a latent stochastic behavior policy;
    repeatedly sampling the training dataset for a number of times to generate a number of training subsets and a number of validation subsets;
    training a task-oriented dialogue model based on an entropy loss using training data in a first training subset of the number of training subsets;
    generating, by the task-oriented dialogue model, predicted dialogue rollouts from dialogue data in a first validation subset of the number of validation subsets;
    adding the predicted dialogue rollouts to a pairwise causal learning subset;
    sampling a pair of dialogue rollouts from the pairwise causal learning subset; and
    training the task-oriented dialogue model based on a binary cross-entropy loss between a preferred probability between the pair of dialogue rollouts and a normalized metric score based on the pair of dialogue rollouts.

\* \* \* \* \*